(12) United States Patent
Okada et al.

(10) Patent No.: US 11,697,737 B2
(45) Date of Patent: *Jul. 11, 2023

(54) COLOR MATERIAL DISPERSION LIQUID, COMPOSITION, FILM, OPTICAL FILTER AND DISPLAY DEVICE

(71) Applicant: DAI NIPPON PRINTING CO., LTD., Tokyo-to (JP)

(72) Inventors: Masato Okada, Tokyo-to (JP); Hiroko Amano, Tokyo-to (JP); Tomoki Murata, Tokyo-to (JP); Fumiyasu Murakami, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,517

(22) Filed: Oct. 12, 2022

(65) Prior Publication Data

US 2023/0094496 A1    Mar. 30, 2023

Related U.S. Application Data

(63) Continuation of application No. 17/053,376, filed as application No. PCT/JP2019/018040 on Apr. 26, 2019, now Pat. No. 11,518,888.

(30) Foreign Application Priority Data

May 9, 2018  (JP) ................. 2018-090861

(51) Int. Cl.
    *C09B 47/00* (2006.01)
    *C09B 57/00* (2006.01)
    (Continued)

(52) U.S. Cl.
    CPC .......... *C09B 67/0066* (2013.01); *C09B 47/00* (2013.01); *C09B 57/007* (2013.01); *G02B 5/223* (2013.01)

(58) Field of Classification Search
    CPC ... C09B 47/00; C09B 57/007; C09B 67/0066; G02B 5/223
    See application file for complete search history.

(56) References Cited

U.S. PATENT DOCUMENTS

2010/0108957 A1  5/2010  Ishida et al.
2011/0245538 A1  10/2011  Kato et al.
(Continued)

FOREIGN PATENT DOCUMENTS

JP    S57122420 A    7/1982
JP    2006-056913 A  3/2006
(Continued)

OTHER PUBLICATIONS

Oct. 28, 2021 Office Action issued in U.S. Appl. No. 17/053,376.
(Continued)

*Primary Examiner* — Bijan Ahvazi
(74) *Attorney, Agent, or Firm* — Oliff PLC

(57) ABSTRACT

A salt-forming compound represented by the following general formula (3):

General Formula (3)

(Continued)

where $X^1$ and $X^2$ each independently represent an aromatic ring group optionally containing a substituent; Y represents a divalent hydrocarbon group that the carbon atom directly bound to $X^1$ or $X^2$ does not have a π bond; $Z^+$ represents an organic cation group; e represents an integer of from 1 to 4; and when e is 2 or more, a plurality of Ys and a plurality of $Z^+$ s may be each the same or different; $A^{c-}$ represents a heteropolyoxometalate anion which is a c-valent anion and which has an oxidation-reduction potential larger than −0.3 V relative to the silver/silver chloride electrode; f and c are each an integer of 2 or more; g is an integer of 1 or more; and the salt-forming compound is a normal salt that f×e=c×g.

4 Claims, 2 Drawing Sheets

(51) Int. Cl.
  *C09B 67/20* (2006.01)
  *G02B 5/22* (2006.01)

(56) References Cited

U.S. PATENT DOCUMENTS

| | | | |
|---|---|---|---|
| 2012/0091448 | A1 | 4/2012 | Ueno et al. |
| 2012/0229423 | A1 | 9/2012 | Takamiya et al. |
| 2013/0115469 | A1 | 5/2013 | Hayashi et al. |
| 2014/0037866 | A1 | 2/2014 | Okada |

FOREIGN PATENT DOCUMENTS

| | | | |
|---|---|---|---|
| JP | 2006-073856 A | | 3/2006 |
| JP | 3834479 B2 | | 10/2006 |
| JP | 2009-040860 A | | 2/2009 |
| JP | 2009-251511 A | | 10/2009 |
| JP | 2010-018788 A | | 1/2010 |
| JP | 4485778 B2 | | 6/2010 |
| JP | 2011-166062 A | | 8/2011 |
| JP | 2011-208101 A | | 10/2011 |
| JP | 2012-063629 A | | 3/2012 |
| JP | 5020258 B2 | | 9/2012 |
| JP | 2015-048432 A | | 3/2015 |
| JP | 2017-002191 A | | 1/2017 |
| JP | 2017-181705 A | | 10/2017 |
| JP | 2018-051918 A | | 4/2018 |
| JP | 2018-060607 A | | 4/2018 |
| WO | 2011/065531 A1 | | 6/2011 |
| WO | 2012/018087 A1 | | 2/2012 |
| WO | 2012/144521 A1 | | 10/2012 |

OTHER PUBLICATIONS

Jan. 28, 2022 Office Action issued in U.S. Appl. No. 17/053,376.
May 3, 2022 Office Action issued in U.S. Appl. No. 17/053,376.
Aug. 10, 2022 Notice of Allowance issued in U.S. Appl. No. 17/053,376.
Song et al., "Redox properties of Keggin-type heteropolyacid (HPA) catalysts: effect of counter-cation, heteroatom, and polyatom substitution," Journal of Molecular Catalysis A: Chemical 212 (2004), 229-236.
Chao Zou, Zhijuan Zhang, Xuan Xu, Qihan Gong, Jing Li, and Chuan-De Wu, A Multifunctional Organic-Inorganic Hybrid Structure Based on MnIII-Porphyrin and Polyoxometalate as a Highly Effective Dye Scavenger and Heterogenous Catalyst, J. Am. Chem. Soc. 2012,134, 87-90 (Year: 2012).
Junyong Zhanga, Chunhua Gonga, Xianghua Zeng, JiahuiShu, Pingxiu Xiao, Jingli, Xie, Fabrication of crystalline porphyrinic polyoxometalate cluster with high thermal stability and exploration of its photocatalytic activity, Polyhedron, vol. 121, Jan. 10, 2017, pp. 95-100. (Year: 2017).
Yue Lia, , Huaizhong Zhangb, Ying Jianga, Meng Shia, Mbage Bawaa, Xiaohong Wang, Suiyi Zhu Assembly of metallophthalocyanine-polyoxometalate hybrid for highly efficient desulfurization of organic and inorganic sulfur under aerobic conditions, Fuel 241 (2019) 861-869 (Year: 2019).

COLOR MATERIAL DISPERSION LIQUID, COMPOSITION, FILM, OPTICAL FILTER AND DISPLAY DEVICE

CROSS-REFERENCE TO RELATED APPLICATION

This is a Continuation of application Ser. No. 17/053,376 filed Nov. 6, 2020, which in turn is a National Stage of PCT/JP2019/018040 filed Apr. 26, 2019, which claims the benefit of Japanese Patent Application No. 2018-090861 filed May 9, 2018. The disclosure of the prior application[s] is hereby incorporated by reference herein in its entirety.

TECHNICAL FIELD

The disclosure relates to a color material dispersion liquid, a composition, a film, an optical filter and a display device.

BACKGROUND ART

In recent years, white LEDs are often used as the light sources of lighting instruments or display devices. The white LED has several types of light emitting methods, such as a method for obtaining white light by arranging R (red), G (green) and B (blue) light emitting LEDs, and a method for obtaining white light by combining blue light emitted from a blue LED with yellow light emission from a yellow fluorescent substance. In the case of using, of these methods, the method for obtaining white light by combining the blue LED with the yellow fluorescent substance, the spectrum of the thus-obtained white light includes, a light in orange color in a range around 590 nm and a light in cyan color around 490 nm, and it is known that as the light emission intensity of the light in this range increases, the color rendering properties decrease.

To eliminate unnecessary light emitting components and obtain vivid display colors, an optical filter is conventionally disposed on the front surface of a display device.

For example, to suppress a decrease in the color purity of a plasma display caused by neon light, an optical filter containing a tetraazaporphyrin compound which has an absorption maximum wavelength in a wavelength range of around 570 nm to 600 nm, for example, is disclosed (Patent Documents 1, 2).

However, there is a problem of deterioration of optical properties, since the organic dye is likely to deteriorate when the optical filter containing the organic dye is used for a long period of time. To solve the problem, various kinds of additives have been proposed, such as a method of adding a combination of a hindered amine compound and a triazine compound to a porphyrin derivative compound (Patent Document 3) and a method for adding a specific triphenylamine to a tetraazaporphyrin compound (Patent document 4).

As a method for suppressing a deterioration of the organic dye, for example, for the purpose of providing such an optical filter that excellent light resistance and moist heat resistance are exhibited in the pressure-sensitive adhesive layer, inserting a dye cation in a layered cray mineral such as smectite, has been proposed (Patent Literature 5). As a color material excellent in heat resistance and light resistance, the inventors of the present invention have proposed a compound in which salt is formed between an aminium or diimonium dye and a heteropolyoxometalate anion (Patent Document 6).

CITATION LIST

Patent Documents

Patent Document 1: Japanese Patent No. 3834479
Patent Document 2: Japanese Patent No. 4485778
Patent Document 3: Japanese Patent Application Laid-Open (JP-A) No. 2006-56913
Patent Document 4: JP-A No. 2012-63629
Patent Document 5: Japanese Patent No. 5020258
Patent Document 6: JP-A No. 2015-48432

SUMMARY OF INVENTION

Technical Problem

To suppress light in an unnecessary wavelength range, which is caused by a light source, an optical member or outside light reflection, it seems effective to use a dye that selectively absorbs the light in the unnecessary wavelength range. However, conventional dye compounds still have a problem of poor light resistance, and the prior art as described above cannot obtain a film that is excellent in light resistance, while suppressing a decrease in light transmission efficiency and selectively and effectively reducing the light in the unnecessary wavelength range.

The disclosed embodiments were achieved in light of the above circumstances. An object of the disclosed embodiments is to provide a color material dispersion liquid and a composition, both of which can form a film that is excellent in light resistance while selectively and effectively reducing the light in the unnecessary wavelength range; a film and an optical filter, both of which are excellent in light resistance, while selectively and effectively reducing the light in the unnecessary wavelength range; and a display device comprising the optical filter and decreasing the light in the unnecessary wavelength range.

Solution to Problem

In a first embodiment, there is provided a color material dispersion liquid comprising a color material, which is a salt-forming compound of an organic dye with a heteropolyoxometalate, a dispersant and a solvent,
wherein the organic dye is at least one organic dye selected from the group consisting of a porphyrin dye, a tetraazaporphyrin dye, a phthalocyanine dye and a squarylium dye, and
wherein the heteropolyoxometalate is a heteropolyoxometalate which has an oxidation-reduction potential larger than −0.3 V relative to the silver/silver chloride electrode.

In another embodiment, there is provided a composition comprising a color material, which is a salt-forming compound of an organic dye with a heteropolyoxometalate, and a binder component,
wherein the organic dye is at least one organic dye selected from the group consisting of a porphyrin dye, a tetraazaporphyrin dye, a phthalocyanine dye and a squarylium dye, and
wherein the heteropolyoxometalate is a heteropolyoxometalate which has an oxidation-reduction potential larger than −0.3 V relative to the silver/silver chloride electrode.

In another embodiment, there is provided an optical filter comprising a color material, which is a salt-forming compound of an organic dye with a heteropolyoxometalate, wherein the organic dye is at least one organic dye selected from the group consisting of a porphyrin dye, a tetraazaporphyrin dye, a phthalocyanine dye and a squarylium dye, and wherein the heteropolyoxometalate is a heteropolyoxometalate which has an oxidation-reduction potential larger than −0.3 V relative to the silver/silver chloride electrode.

In the color material dispersion liquid, composition and optical filter of the disclosed embodiments, the heteropolyoxometalate of the salt-forming compound may be a heteropolyoxometalate containing vanadium.

In the color material dispersion liquid, composition and optical filter of the disclosed embodiments, the color material may be at least one salt-forming compound selected from the group consisting of a salt-forming compound represented by the following general formula (1) and a salt-forming compound represented by the following general formula (3):

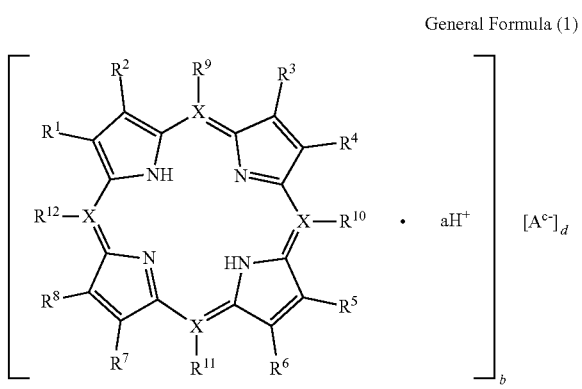

General Formula (1)

where $R^1$ to $R^{12}$ each independently represent a hydrogen atom, a halogen atom, a nitro group, a cyano group, a hydroxy group, an amino group, a carboxyl group, a sulfonic acid group, an alkoxy group optionally containing a substituent, an aryloxy group optionally containing a substituent, a monoalkylamino group optionally containing a substituent, a dialkylamino group optionally containing a substituent, an alkylthio group optionally containing a substituent, an arylthio group optionally containing a substituent, an alkyl group optionally containing a substituent or an aromatic ring group optionally containing a substituent; X represents a carbon atom or a nitrogen atom; and when X is a nitrogen atom, $R^9$ to $R^{12}$ are not present; or $R^1$ and $R^2$, $R^3$ and $R^4$, $R^5$ and $R^6$, $R^7$ and $R^8$ may each independently form a ring, and the ring may contain an unsaturated bond;

$A^{c-}$ represents a heteropolyoxometalate anion which is a c-valent anion and which has an oxidation-reduction potential larger than −0.3 V relative to the silver/silver chloride electrode; a, b and c are each an integer of 2 or more; d is an integer of 1 or more; and the salt-forming compound is a normal salt that a×b=c×d,

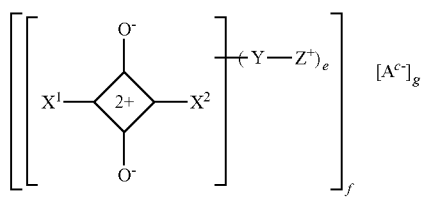

General Formula (3)

where $X^1$ and $X^2$ each independently represent an aromatic ring group optionally containing a substituent; Y represents a divalent organic group; $Z^+$ represents an organic cation group; e represents an integer of from 1 to 4; and when e is 2 or more, a plurality of Ys and a plurality of $Z^+$s may be each the same or different;

$A^{c-}$ represents a heteropolyoxometalate anion which is a c-valent anion and which has an oxidation-reduction potential larger than −0.3 V relative to the silver/silver chloride electrode; f and c are each an integer of 2 or more; g is an integer of 1 or more; and the salt-forming compound is a normal salt that f×e=c×g.

The composition of the disclosed embodiments may further comprise a dispersant.

In another embodiment, there is provided a film comprising the composition of the disclosed embodiments or a cured product thereof.

In another embodiment, there is provided a display device comprising the optical filter of the disclosed embodiments.

Advantageous Effects of Invention

According to the disclosed embodiments, the following can be provided: a color material dispersion liquid and a composition, both of which can form a film that is excellent in light resistance while selectively and effectively reducing the light in the unnecessary wavelength range; a film and an optical filter, both of which are excellent in light resistance, while selectively and effectively reducing the light in the unnecessary wavelength range; and a display device comprising the optical filter and decreasing the light in the unnecessary wavelength range.

BRIEF DESCRIPTION OF DRAWINGS

In the accompanying drawings.

DESCRIPTION OF EMBODIMENTS

Figure 1:
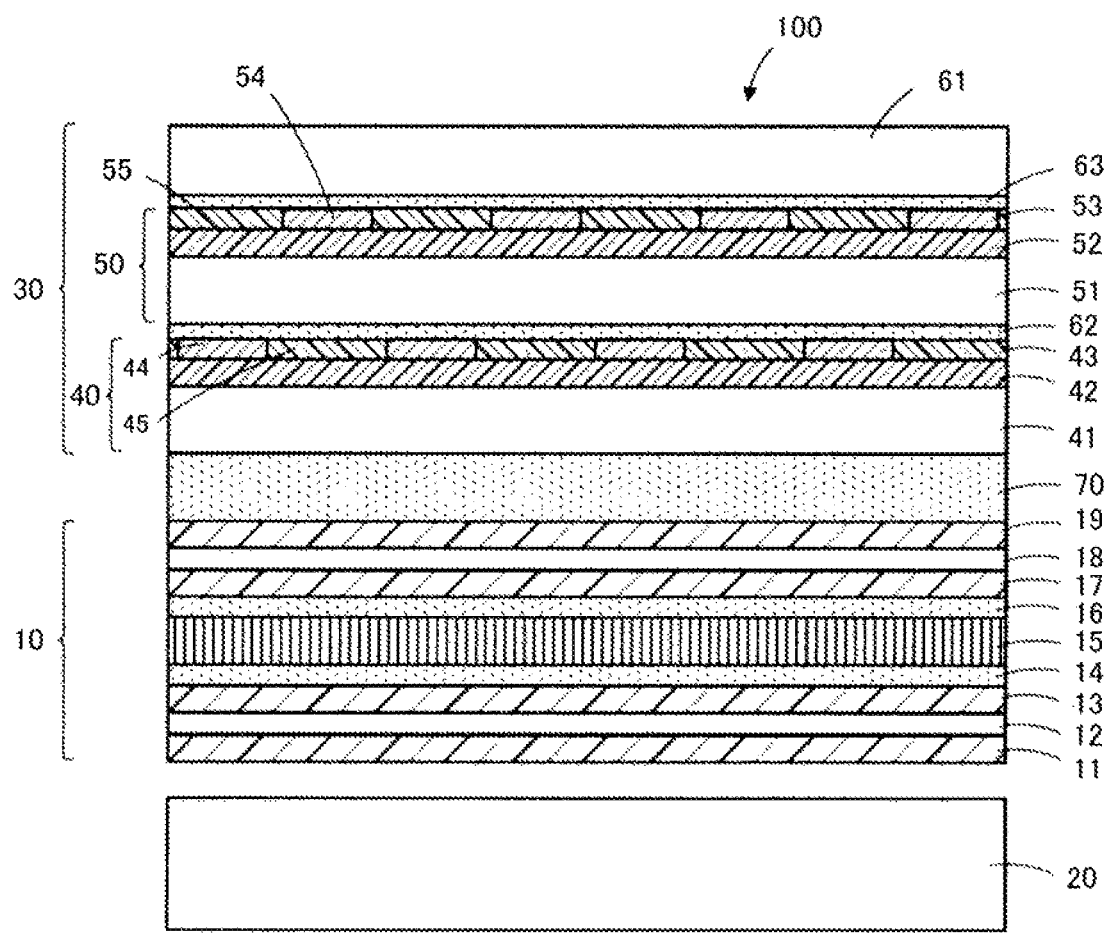
FIG. 1 is a schematic configuration diagram of an example of the display device of the disclosed embodiments.

Hereinafter, descriptions will be made about embodiments, working examples and others in the present disclosure with reference to the drawings and so on. However, about the present disclosure, many different embodiments can be carried out. Thus, the present invention should not be interpreted with any limitation to described contents of the embodiments, the working examples, and the others, which will be given as examples. In order to make a description about each of the drawings clearer, the width, the thickness, the shape and any other factors of each part or portion therein may be schematically illustrated, differently from that of a part or portion in an actual form. However, the illustrated factors are each a mere example not to limit the interpretation of the present disclosure. In the document DESCRIPTION, and each of the drawings, to the same element as in any one of the drawings referred to already is attached the same reference number; thus, a detailed description thereabout may be appropriately omitted. For the convenience of the descriptions, any word such as a word "upward" or "downward" may be used. However, the upward and downward directions may also be reversed.

In the DESCRIPTION, in a case where, for example, any constituent such as any member or region is "on (or beneath) of a different constituent such as a different member or region, examples of this case include not only a case where the constituent is just on (or just beneath) of the different constituent, but also a case where the constituent is over or above (or under or below) of the different constituent, that is, a case where an additional constituent is included between the two to be over or above (or under or below) the constituent unless otherwise specified.

In the DESCRIPTION, "(meth)acrylic" means any of acrylic and methacrylic, and "(meth)acrylate" means any of acrylate and methacrylate.

Also in the DESCRIPTION, the terms "plate", "sheet" and "film" are based only on differences in names and are not distinguished from each other, and the term "film surface (plate surface, sheet surface)" refers to a surface corresponding to, when a target film-shaped (plate-shaped, sheet-shaped) member is viewed wholly from a large perspective, the planar direction of the target film-shaped member (plate-shaped member, sheet-shaped member).

Also in the DESCRIPTION, the term "organic dye" refers to a compound which is a dye compound containing a carbon atom and which absorbs at least part of visible light (light of a wavelength of from 400 nm to 700 nm) and near-infrared light (light of a wavelength of from 700 nm to 1100 nm), and the term "color material" refers to a compound which absorbs at least part of visible light (light of a wavelength of from 400 nm to 700 nm) and near-infrared light (light of a wavelength of from 700 nm to 1100 nm), and it encompasses a compound which absorbs near-infrared light only.

Also, the term "organic group" refers to a group containing a carbon atom. The term "organic cation" refers to a cation that the cation moiety contains a carbon atom.

Hereinafter, the color material dispersion liquid, composition, film, optical filter, display device of the disclosed embodiments will be described in sequence.

A. Color Material Dispersion Liquid

The color material dispersion liquid of the disclosed embodiments is a color material dispersion liquid comprising a color material, which is a salt-forming compound of an organic dye with a heteropolyoxometalate, a dispersant and a solvent, wherein the organic dye is at least one organic dye selected from the group consisting of a porphyrin dye, a tetraazaporphyrin dye, a phthalocyanine dye and a squarylium dye, and wherein the heteropolyoxometalate is a heteropolyoxometalate which has an oxidation-reduction potential larger than −0.3 V relative to the silver/silver chloride electrode.

The color material dispersion liquid of the disclosed embodiments contains the color material, which is the salt-forming compound of the predetermined organic dye with the heteropolyoxometalate having an oxidation-reduction potential of larger than −0.3 V relative to the silver/silver chloride electrode.

The organic dye dissolves in a solvent to form a film. However, since the organic dye is likely to aggregate in the film and to deposit, the organic dye falls into a situation where it is difficult for the organic dye to form a uniform film and, as a result, to effectively and uniformly exhibit the function of selectively absorbing the light of an unnecessary emission wavelength. Also, the organic dye has a long outstanding problem of poor light resistance.

When the organic dye forms the salt-forming compound with the heteropolyoxometalate, two or more cationized predetermined organic dyes form an ionic bond with one polyvalent heteropolyoxometalate anion. Accordingly, in the color material of the disclosed embodiments, the plural organic dyes are arranged around the heteropolyoxometalate anion to form one molecule, and ion pair formation is possible between the molecules. Accordingly, molecular association is promoted and, as a result, the color material becomes fine particles hardly soluble in the solvent.

According to the color material dispersion liquid of the disclosed embodiments, the color material being the salt-forming compound is combined with the dispersant to disperse the color material in the solvent by the dispersant. Accordingly, even in the solvent and the film, the color material is uniformly dispersed in the state of fine particles. Accordingly, by using the color material dispersion liquid of the disclosed embodiments, the film that can uniformly exhibit the function of selectively absorbing the light of the unnecessary emission wavelength, can be formed. Especially, since the color material of the disclosed embodiments uses the above-mentioned predetermined organic dye, sharp absorption with a narrow half-width can be realized in at least all of the visible light range, and various specific wavelengths can be selectively absorbed depending on the intended application. The porphyrin dye exhibits absorption with a narrow half-width in a visible light wavelength range of from 400 nm to 500 nm, and the tetraazaporphyrin or phthalocyanine dye having a similar skeleton to the porphyrin dye exhibits absorption with a narrow half-width in a wavelength range of from 500 nm to 1000 nm. The squarylium dye exhibits absorption with a narrow half-width in a wavelength range of from 400 nm to 900 nm.

A point in common between the porphyrin, tetraazaporphyrin and phthalocyanine dyes is that they are organic compounds having a cyclic structure formed by a combination of four pyrroles. Since they can be turned into a cation by the protonation, etc., of the nitrogen atoms of the pyrroles, ion pair formation with the heteropolyoxometalate anion is possible. Also, since the squarylium dye can be turned into a cation by the protonation, etc., of the nitrogen atom in the molecule, ion pair formation with the heteropolyoxometalate anion is possible.

Each of the predetermined organic dyes has a fundamental absorption range. The absorption maximum can be shifted by the introduction of a substituent or the extension of a n-electron framework, and ion pair formation with the heteropolyoxometalate anion is possible. Accordingly, depending on the combination thereof, it is excellent in the function of selectively absorbing the light of the specific wavelength of visible light (wavelength 400 nm to 700 nm) and of near-infrared light (wavelength 700 nm to 1100 nm).

When the color material is present in the state of fine particles in the film, it is estimated that light deterioration is likely to occur only on the particle surface, and the promotion of light deterioration is suppressed.

Also, the inventors of the disclosed embodiments found a new method for suppressing light deterioration and increasing light resistance.

The discoloration mechanism caused by the light of the organic dye is thought to be a "self-sensitized light singlet oxygen oxidation reaction" described below. The "self-sensitized light singlet oxygen oxidation reaction" is such a mechanism that, first, singlet oxygen is generated by the energy which is generated when the organic dye is photoexcited and returns to the ground state, and the singlet oxygen, which has high reactivity, oxidizes the organic dye, thereby discoloring the organic dye.

In the disclosed embodiments, a new method for suppressing the singlet oxygen generation is used. That is, due to the formation of the salt-forming compound of the predetermined organic dye with the heteropolyoxometalate having an oxidation-reduction potential larger than the predetermined value and a property of being easily reduced, the heteropolyoxometalate having a property of being easily reduced absorbs the energy which is generated when the organic dye is photoexcited and returns to the ground state, whereby the singlet oxygen generation can be suppressed during light irradiation. As a result, the light resistance of the color material being the salt-forming compound is further increased.

The color material dispersion liquid of the disclosed embodiments contains at least a color material, a dispersant and a solvent. As needed, it may contain other components.

Hereinafter, the components of the color material dispersion liquid of the disclosed embodiments will be described in detail.

(Color Material)

The color material used in the disclosed embodiments is a color material which is a salt-forming compound of an organic dye with a heteropolyoxometalate, and the organic dye is at least one organic dye selected from the group consisting of a porphyrin dye, a tetraazaporphyrin dye, a phthalocyanine dye and a squarylium dye, and the heteropolyoxometalate is a heteropolyoxometalate which has an oxidation-reduction potential larger than −0.3 V relative to the silver/silver chloride electrode.

The at least one organic dye selected from the group consisting of a porphyrin dye, a tetraazaporphyrin dye and a phthalocyanine dye, is preferably a compound that does not contain a metal atom in the center, since it is cationized by protonation of a nitrogen atom constituting a pyrrole ring and is likely to form a salt with the heteropolyoxometalate anion. For example, it may be a compound represented by the following general formula (1-1):

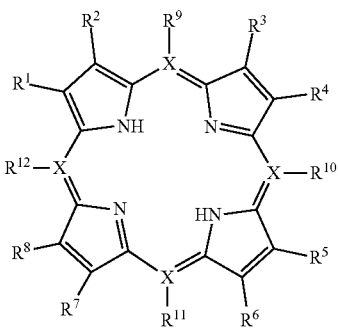

General Formula (1-1)

where $R^1$ to $R^{12}$ each independently represent a hydrogen atom, a halogen atom, a nitro group, a cyano group, a hydroxy group, an amino group, a carboxyl group, a sulfonic acid group, an alkoxy group optionally containing a substituent, an aryloxy group optionally containing a substituent, a monoalkylamino group optionally containing a substituent, a dialkylamino group optionally containing a substituent, an alkylthio group optionally containing a substituent, an arylthio group optionally containing a substituent, an alkyl group optionally containing a substituent or an aromatic ring group optionally containing a substituent; X represents a carbon atom or a nitrogen atom; and when X is a nitrogen atom, $R^9$ to $R^{12}$ are not present; or $R^1$ and $R^2$, $R^3$ and $R^4$, $R^5$ and $R^6$, $R^7$ and $R^8$ may each independently form a ring, and the ring may contain an unsaturated bond.

In the general formula, as the halogen atom as $R^1$ to $R^{12}$, examples include, but are not limited to, fluorine, chlorine, bromine, an iodine atom.

The alkoxy group may be an alkoxy group having 1 to 8 carbon atoms, such as a methoxy group, an ethoxy group, an n-propoxy group, an iso-propoxy group, an n-butoxy group, an iso-butoxy group, a sec-butoxy group, a t-butoxy group, an n-pentoxy group, an iso-pentoxy group, a neo-pentoxy group and an n-hexyloxy group.

The aryloxy group may be an aryloxy group having 6 to 12 carbon atoms, such as a phenoxy group.

The monoalkylamino group may be a monoalkylamino group having 1 to 8 carbon atoms, such as a methylamino group, an ethylamino group, an n-propylamino group, an n-butylamino group and an n-hexylamino group.

The dialkylamino group may be a dialkylamino group having 1 to 12 carbon atoms, such as a dimethylamino group, a diethylamino group, a di-n-propylamino group, a di-n-butylamino group and an N-methyl-N-cyclohexylamino group.

The alkylthio group may be an alkylthio group having 1 to 8 carbon atoms, such as a methylthio group, an ethylthio group, an n-propylthio group, an iso-propylthio group, an n-butylthio group, a t-butylthio group and an n-pentylthio group.

The arylthio group may be an arylthio group having 6 to 12 carbon atoms, such as a phenylthio group and a naphthylthio group.

In the general formula, the alkyl group as $R^1$ to $R^{12}$ may be any of linear, branched, cyclic alkyl groups. It may be an alkyl group having 1 to 8 carbon atoms, such as a methyl group, an ethyl group, an n-propyl group, an iso-propyl group, an n-butyl group, an iso-butyl group, a sec-butyl group, a t-butyl group, an n-pentyl group, a 2-methylbutyl group, a cyclopentyl group, an n-hexyl group, a cyclohexyl group, an n-heptyl group, an n-octyl group and a 2-ethylhexyl group.

In the general formula, the aromatic ring group as $R^1$ to $R^{12}$ may be an aromatic hydrocarbon group or an aromatic heterocyclic group. For example, the aromatic hydrocarbon group may be an aromatic hydrocarbon group having 6 to 12 carbon atoms, such as a phenyl group and a naphthyl group. The aromatic heterocyclic group may be a pyrrolyl group, a thienyl group, a furanyl group, an oxazolyl group, an isoxazolyl group, an oxadiazolyl group, an imidazolyl group, a benzoxazolyl group, a benzothiazolyl group, a benzimidazolyl group, a benzofuranyl group or an indolyl group, for example.

In the general formula, the alkoxy group, aryloxy group, monoalkylamino group, dialkylamino group, alkylthio group, arylthio group, alkyl group or aromatic ring group as $R^1$ to $R^{12}$ may contain a substituent.

In $R^1$ to $R^{12}$ of the general formula, the alkyl chain moiety of each substituent may contain a substituent. The substituent may be the halogen atom, the nitro group, the cyano group, the hydroxy group, the amino group, the carboxyl group, the sulfonic acid group, the alkoxy group, the aryloxy group, the monoalkylamino group or the dialkylamino group, or it may be a trifluoromethyl group or an aromatic ring group optionally containing a substituent. That is, an aralkyl group such as a benzyl group, a benzyloxy group, an alkoxyalkoxy group or the like is preferably used.

In $R^1$ to $R^{12}$ of the general formula, the aryl moiety of each substituent and the aromatic ring group may contain a substituent. The substituent may be the halogen atom, the nitro group, the cyano group, the hydroxy group, the amino group, the carboxyl group, the sulfonic acid group, the alkoxy group optionally containing a substituent, the aryloxy group optionally containing a substituent, the monoalkylamino group optionally containing a substituent, the dialkylamino group optionally containing a substituent, the alkyl group optionally containing a substituent, and a trifluoromethyl group.

Or, $R^1$ and $R^2$, $R^3$ and $R^4$, $R^5$ and $R^6$, $R^7$ and $R^8$ may each independently form a ring which may contain an unsaturated bond. Examples of the ring include the case where 5 to 7-membered rings and condensed rings thereof are formed. As the ring, examples include, but are not limited to, the case where a benzene ring is condensed to the pyrrole ring to which a $R^1$ and $R^2$, $R^3$ and $R^4$, $R^5$ and $R^6$, $R^7$ and $R^8$ are each bound, the case where a naphthalene ring is condensed to the pyrrole ring, and the case where an azulene ring is condensed to the pyrrole ring. These formed ring structures may further contain the substituent that the aromatic ring group may contain.

Also, as the ring, for example, $R^1$ and $R^2$, etc., may be linked to form a ring by an alkylene chain which may contain a substituent such as —$CH_2CH_2CH_2CH_2$—, —$CH_2CH_2CH(NO_2)CH_2$—, —$CH_2CH(CH_3)CH_2CH_2$— and —$CH_2CH(Cl)CH_2CH_2$—.

X represents a carbon atom or a nitrogen atom. In the case of the porphyrin dye, X represents a carbon atom. In the case of the tetraazaporphyrin dye and the phthalocyanine dye, X represents a nitrogen atom.

As the porphyrin dye, the tetraazaporphyrin dye and the phthalocyanine dye, examples include, but are not limited to, the following: the compound 5-1 described in paragraph 0044 of Japanese Patent Application Laid-Open (JP-A) No. 2006-73856 and the compound 6-1 described in paragraph 0045 thereof; the compound described in paragraphs 0038 to 0042 of JP-A No. 2011-166062; the compound obtained by substituting the metal atom in the center of the compound described in paragraphs 0021 to 0034 of JP-A No. 2012-63629 with two hydrogen atoms; and the compound obtained by substituting the metal atom in the center of the compound described in paragraphs 0083 to 0097 of JP-A No. 2010-18788 with two hydrogen atoms. This content is incorporated in the DESCRIPTION; however, the dyes are not limited to them.

The $R^1$ to $R^{12}$ and X of the general formula may be appropriately selected from the viewpoint of obtaining desired absorption wavelength and depending on absorption width, etc.

$R^1$ to $R^8$ are each preferably the same, from the point of view that the symmetry of the electronic state relating to the coloration of the porphyrin, tetraazaporphyrin and phthalocyanine dyes is increased, and the dyes give narrow absorption with an acute, sharp half-width.

$R^1$ to $R^8$ are each independently preferably a hydrogen atom, an alkyl group having 1 to 12 carbon atoms, an aralkyl group or an aromatic ring group, especially from the viewpoint of sufficiently ensuring the solubility of the dyes during the salt formation with the heteropolyoxometalate.

$R^9$ to $R^{12}$ are each independently preferably the same, from the point of view that the symmetry of the electronic state relating to the coloration of the porphyrin dye is increased, and the dye gives narrow absorption with an acute, sharp half-width.

$R^9$ to $R^{12}$ are each independently preferably a hydrogen atom, an alkyl group having 1 to 12 carbon atoms, an aralkyl group or an aromatic ring group, especially from the viewpoint of obtaining desired absorption wavelength, sufficiently ensuring absorption width, and sufficiently ensuring the solubility of the dye during the salt formation with the heteropolyoxometalate.

The squarylium dye refers to a dye containing a 4-membered ring derived from squaric acid.

The squarylium dye may be a compound represented by the following formula (2-1), for example:

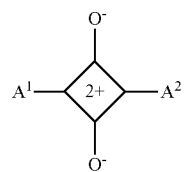

General Formula (2-1)

where $A^1$ and $A^2$ each independently represent an aromatic ring group optionally containing a substituent, or a group represented by the following general formula (2-2):

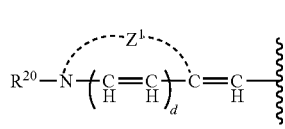

General Formula (2-2)

where $Z^1$ represents a non-metallic atomic group forming a nitrogen-containing heterocyclic ring; $R^{20}$ represents an alkyl group, an alkenyl group or an aralkyl group; d represents 0 or 1; and the wavy line represents a linking moiety.

$A^1$ and $A^2$ of the general formula (2-1) each independently represent an aromatic ring group optionally containing a substituent, or a group represented by the general formula (2-2).

The aromatic ring group may be an aromatic hydrocarbon group, that is, an aryl group, or may be an aromatic heterocyclic group, that is, a heteroaryl group.

The aromatic hydrocarbon group represented by $A^1$ and $A^2$ preferably has 6 to 48 carbon atoms, more preferably 6 to 24 carbon atoms, and still more preferably 6 to 12 carbon atoms. The aromatic hydrocarbon group may be a single ring or a condensed ring.

The aromatic heterocyclic group represented by $A^1$ and $A^2$ is preferably a 5-membered ring or a 6-membered ring. Also, the aromatic heterocyclic group may be a single ring or a condensed ring, and it is preferably a single ring or a condensed ring having a condensation number of from 2 to 8, more preferably a single ring or a condensed ring having a condensation number of from 2 to 4, and still more preferably a single ring or a condensed ring having a condensation number of 2 or 3. As the heteroatom contained in the aromatic heterocyclic group, examples include a nitrogen atom, an oxygen atom, a sulfur atom, and the heteroatom is preferably a nitrogen atom, a sulfur atom. The number of the heteroatom is preferably from 1 to 3, and more preferably 1 to 2. More specifically, examples include, but are not limited to, an aromatic heterocyclic group derived from a single ring, a polycyclic aromatic ring such as a 5- or 6-membered ring containing at least one of a nitrogen atom, an oxygen atom and a sulfur atom.

As the aromatic ring of the aromatic ring group, examples include, but are not limited to, a benzene ring, a naphthalene ring, a pentalene ring, an indene ring, an azulene ring, a heptalene ring, an indacene ring, a perylene ring, a pentacene ring, an acenaphthene ring, a phenanthrene ring, an anthracene ring, a naphthacene ring, a chrysene ring, a triphenylene ring, a fluorene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolizine ring, an indole ring, a benzofuran ring, a benzothiophene ring, an isobenzofuran ring, a quinolizine ring, a quinoline ring, a phthalazine ring, a naphthyridine ring, a quinoxaline ring, a quinoxazoline ring, an isoquinoline ring, a carbazole ring, a phenanthridine ring, an acridine ring, a phenanthroline ring, a pyrrolo[2,1-b]benzothiazole ring, a pyrrolo[2,1-a]isoquinoline ring, a thianthrene ring, a chromene ring, a xanthene ring, a phenoxathiin ring, a phenothiazine ring, and a phenazine ring. The aromatic ring is preferably a benzene ring or a naphthalene ring.

The aromatic ring group as $A^1$ and $A^2$ may contain a substituent. When the aromatic ring group contain two or more substituents, the substituents may be the same or different.

As the substituent, examples include, but are not limited to, a halogen atom, a cyano group, a nitro group, an alkyl group, an alkenyl group, an alkynyl group, an aromatic ring group, an aralkyl group, —$OR^{100}$, —$R^{101}$, —$OCOR^{102}$, —$OCOR^{103}$, —$NR^{104}R^{105}$, —$NHCOR^{106}$, —$CONR^{107}R^{108}$, —$NHCONR^{109}R^{110}$, —$NHCOOR^{111}$, —$SR^{112}$, —$SO_2R^{113}$, —$SO_2R^{114}$, —$NHSO_2R^{115}$, —$SO_2NR^{116}R^{117}$ and —$(R^{118}O)_nR^{119}$. $R^{100}$ to $R^{117}$ and $R^{119}$ each independently represent a hydrogen atom, an alkyl group, an alkenyl group, an alkynyl group, an aromatic ring group or an aralkyl group. $R^{118}$ each independently represents a divalent hydrocarbon group. When $R^{102}$ of —$COOR^{102}$ is hydrogen (that is, a carboxy group), the hydrogen atom may dissociate or may be in the state of salt. When $R^{104}$ of —$SO_2OR^{104}$ is a hydrogen atom (that is, a sulfo group), the hydrogen atom may dissociate or may be in the state of salt.

From the viewpoint of increasing solvent solubility, the divalent hydrocarbon group as $R^{118}$ may be saturated or unsaturated, or it may be any of linear, branched, cyclic, or a combination of cyclic and linear or branched. From the viewpoint of increasing solvent solubility, the divalent hydrocarbon group as $R^{118}$ is preferably a linear or branched hydrocarbon group. The divalent hydrocarbon group as $R^{118}$ preferably has 2 to 8 carbon atoms, more preferably 2 to 6 carbon atoms, and still more preferably 2 to 3 carbon atoms. Also, n may be from 1 to 18, and it is preferably from 1 to 12, and more preferably from 1 to 6.

As the halogen atom, examples include a fluorine atom, a chlorine atom, a bromine atom, an iodine atom.

The alkyl group preferably has 1 to 20 carbon atoms, more preferably 1 to 15 carbon atoms, and still more preferably 1 to 8 carbon atoms. The alkyl group may be any of linear, branched, cyclic, and it is preferably linear or branched.

The alkenyl group preferably has 2 to 20 carbon atoms, more preferably 2 to 12 carbon atoms, and still more preferably 2 to 8 carbon atoms. The alkenyl group may be any of linear, branched, cyclic, and it is preferably linear or branched.

The alkynyl group preferably has 2 to 40 carbon atoms, more preferably 2 to 30 carbon atoms, and still more preferably 2 to 25 carbon atoms. The alkynyl group may be any of linear, branched, cyclic, and it is preferably linear or branched.

Of the aromatic ring groups, the aromatic hydrocarbon group preferably has 6 to 30 carbon atoms, more preferably 6 to 20 carbon atoms, and still more preferably 6 to 12 carbon atoms.

The alkyl moiety of the aralkyl group is the same as the alkyl group. The aryl moiety of the aralkyl group is the same as the aromatic hydrocarbon group. The aralkyl group preferably has 7 to 40 carbon atoms, more preferably 7 to 30 carbon atoms, and still more preferably 7 to 25 carbon atoms.

Of the aromatic ring groups, the aromatic heterocyclic group is preferably a single ring or a condensed ring, more preferably a single ring or a condensed ring having a condensation number of from 2 to 8, and still more preferably a single ring or a condensed ring having a condensation number of from 2 to 4. The number of the heteroatom constituting the ring of the aromatic heterocyclic group, is preferably from 1 to 3. The heteroatom constituting the ring of the aromatic heterocyclic group, is preferably a nitrogen atom, an oxygen atom or a sulfur atom. The aromatic heterocyclic group is preferably a 5- or 6-membered ring. The number of the carbon atoms constituting the ring of the aromatic heterocyclic group, is preferably from 3 to 30, more preferably from 3 to 18, and still more preferably from 3 to 12.

The alkyl group, the alkenyl group, the alkynyl group, the aralkyl group, the aromatic ring group may contain a substituent or may be unsubstituted. As the substituent, examples include the above-described substituents.

In the group represented by the general formula (2-2) which is represented by $A^1$ and $A^2$, $R^{20}$ represents an alkyl group, an alkenyl group or an aralkyl group, and it is preferably an alkyl group.

The alkyl group preferably has 1 to 30 carbon atoms, more preferably 1 to 20 carbon atoms, still more preferably 1 to 12 carbon atoms, and particularly preferably 2 to 8 carbon atoms.

The alkenyl group preferably has 2 to 30 carbon atoms, more preferably 2 to 20 carbon atoms, and still more preferably 2 to 12 carbon atoms.

The alkyl group and the alkenyl group may be any of linear, branched, cyclic. They are preferably linear or branched.

The aralkyl group preferably has 7 to 30 carbon atoms, and more preferably 7 to 20 carbon atoms.

In the general formula (2-2), the nitrogen-containing heterocyclic ring formed by $Z^1$ is preferably a 5-membered ring or a 6-membered ring. The nitrogen-containing heterocyclic ring is preferably a single ring or a condensed ring, more preferably a single ring or a condensed ring having a condensation number of from 2 to 8, still more preferably a single ring or a condensed ring having a condensation number of from 2 to 4, and particularly preferably a condensed ring having a condensation number of 2 or 3. In addition to a nitrogen atom, the nitrogen-containing heterocyclic ring may contain a sulfur atom. The nitrogen-containing heterocyclic ring may contain a substituent. As the substituent, examples include the above-described substituents. For example, the substituent is preferably a halogen atom, an alkyl group, a hydroxy group, an amino group, an acylamino group, and more preferably a halogen atom and an alkyl group. The halogen atom is preferably a chlorine atom. The alkyl group preferably has 1 to 30 carbon atoms, more preferably 1 to 20 carbon atoms, and still more preferably 1 to 12 carbon atoms. The alkyl group is preferably linear or branched.

In the general formula (2-1), the cation is delocalized and present as shown below.

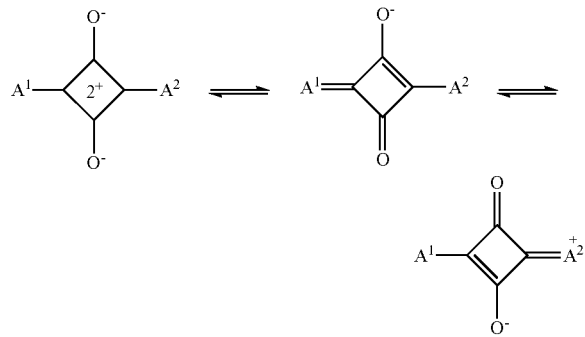

For the details of the formulae (2-1) and (2-2), the description in paragraphs 0055 to 0071 of JP-A No. 2017-181705 and paragraphs 0020 to 0049 of JP-A No. 2011-208101 can be taken into consideration, and they are incorporated in the DESCRIPTION.

The squarylium dye may be a structure having two or more 4-membered rings derived from squaric acid per molecule, such as a structure that any one of $A^1$ and $A^2$ of the compound represented by the formula (2-1) is bound to any one of $A^1$ and $A^2$ of another compound represented by the formula (2-1) by a linking group. The squarylium dye of the structure having two or more 4-membered rings derived from squaric acid per molecule, may be the compound described in paragraphs 0018 to 0019, 0048 to 0093 of JP-A No. 2009-40860.

As the squarylium dye, examples include, but are not limited to, the following compounds. As the squarylium dye, examples also include the compound described in paragraphs 0044 to 0049 of JP-A No. 2011-208101 and the compound described in paragraphs 0018 to 0019, 0048 to 0110 of JP-A No. 2009-40860, and the contents thereof are incorporated in the DESCRIPTION.

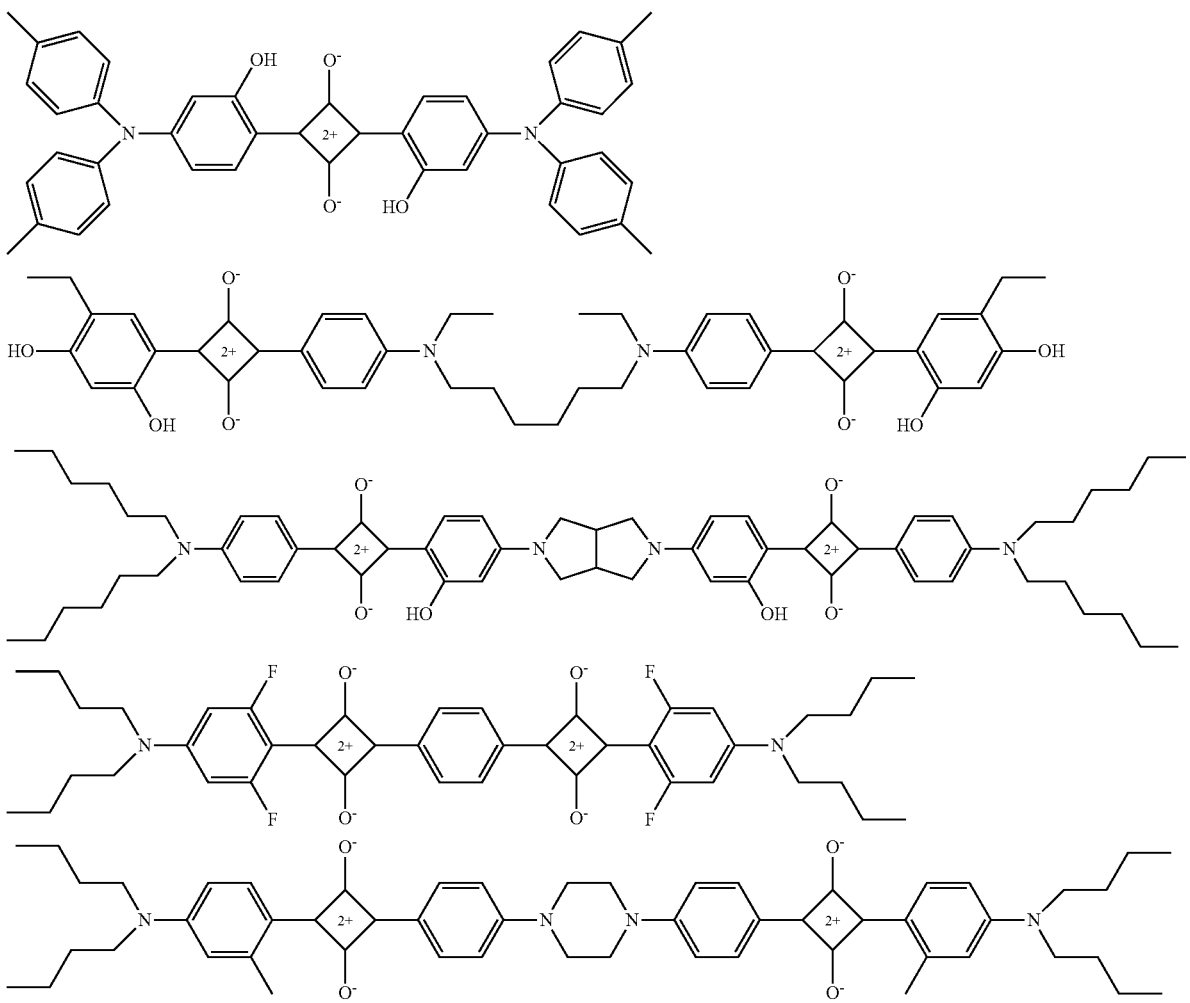

-continued

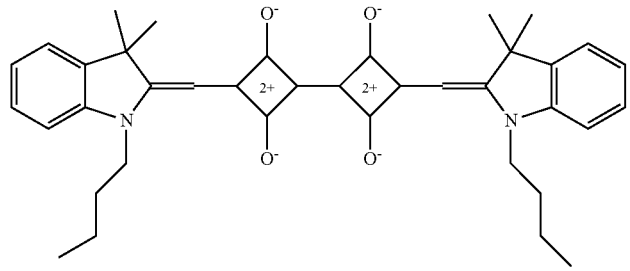
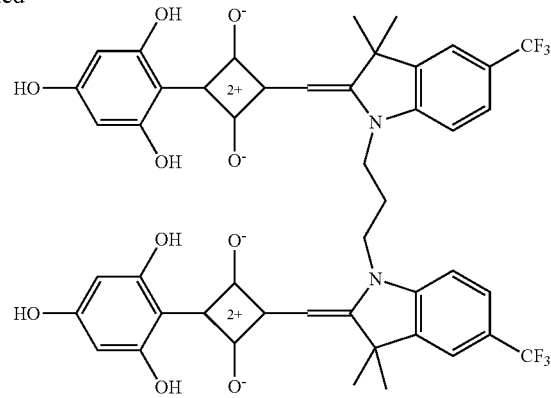
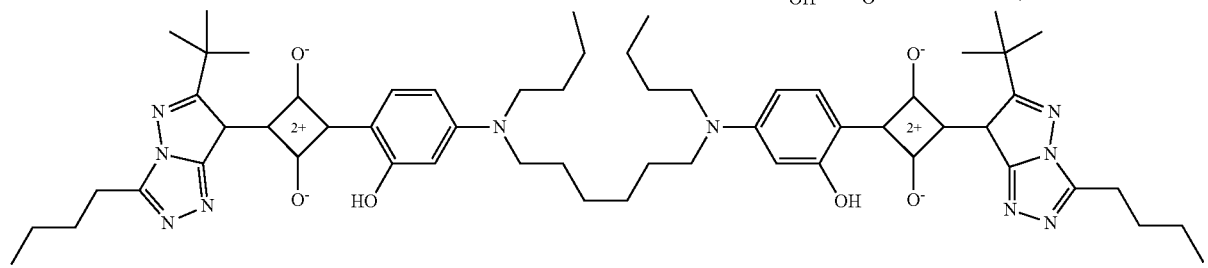
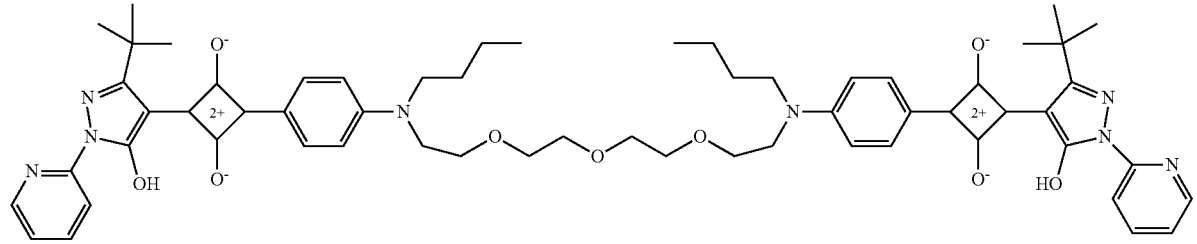
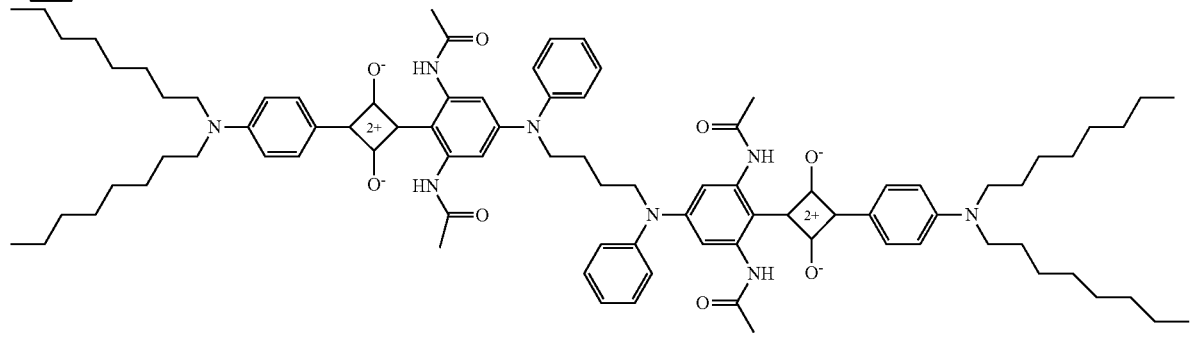

In the present invention, from the viewpoint of narrowing the half-width of an absorption spectrum or transmission spectrum, the squarylium dye is particularly preferably a compound represented by the following general formula (3-1):

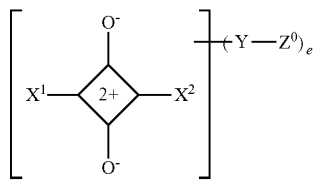

General Formula (3-1)

where $X^1$ and $X^2$ each independently represent an aromatic ring group optionally containing a substituent; Y represents a divalent organic group; $Z^0$ represents a group which can be converted to an organic cation group, or an organic cation group; e represents an integer of from 1 to 4; and when e is 2 or more, a plurality of Ys and a plurality of $Z^0$s may be each the same or different.

The aromatic ring group optionally containing a substituent as $X^1$ and $X^2$ of the general formula (3-1) may be the same as the aromatic ring group optionally containing a substituent as $A^1$ and $A^2$ of the general formula (2-1).

From the viewpoint of increasing solvent solubility, $X^1$ and $X^2$ preferably contain at least one substituent selected from the group consisting of —$(R^{118}O)_nR^{119}$, an aralkyl group, —$OR^{100}$, —$COR^{101}$, —$COOR^{102}$, —$OCOR^{103}$, —$NR^{104}R^{105}$, —$NHCOR^{106}$, —$CONR^{107}R^{108}$, —$NHCONR^{109}R^{110}$, —$NHCOOR^{111}$, —$SR^{112}$, —$SO_2R^{113}$, —SO$_2$OR$^{114}$, —NHSO$_2$R$^{115}$ and —SO$_2$NR$^{116}$R$^{117}$. The —(R$^{118}$O)$_n$R$^{119}$, —OR$^{100}$, —COR$^{101}$, —COOR$^{102}$, —OCOR$^{103}$, —NR$^{104}$R$^{105}$, —NHCOR$^{106}$, —CONR$^{107}$R$^{108}$, —NHCONR$^{109}$R$^{110}$, —NHCOOR$^{111}$, —SR$^{112}$, —SO$_2$R$^{113}$, —SO$_2$OR$^{114}$, —NHSO$_2$R$^{115}$ or —SO$_2$NR$^{116}$R$^{117}$ may be the same as the substituent described in A$^1$ and A$^2$.

From the viewpoint of the ease of giving a dye framework having absorption in the visible range (380 nm to 750 nm), preferred examples of X$^1$ and X$^2$ include, but are not limited to, the following chemical formulae (x-1) to (x-11):

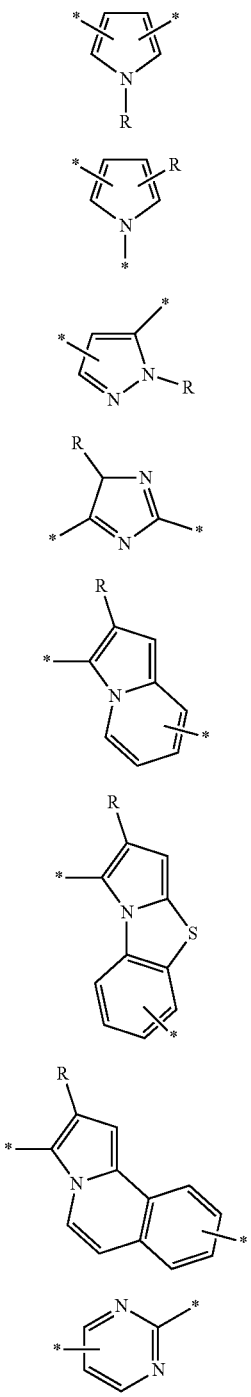

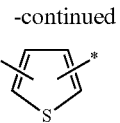

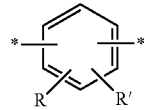

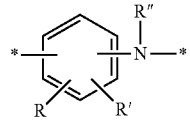

where R, R' and R" each independently represent a hydrogen atom, an alkyl group having 1 to 12 carbon atoms or —(CH$_2$CH$_2$O)$_{n'}$—R$^{120}$; and n' is from 2 to 12; R$^{120}$ represents a hydrocarbon group having 1 to 4 carbon atoms. In the formulae, * indicates a binding position to a 4-membered ring derived from squaric acid or Y.

From the viewpoint of increasing solvent solubility, at least one of R, R' and R" of the chemical formulae (x-1) to (x-11) preferably represents —(CH$_2$CH$_2$O)$_{n'}$—R$^{120}$. In —(CH$_2$CH$_2$O)$_{n'}$—R$^{120}$, n' is preferably from 1 to 8, and more preferably from 1 to 6. R$^{120}$ is preferably a methyl group, an ethyl group, an n-propyl group, an i-propyl group or an n-butyl group.

In the general formula (3-1), Y represents a divalent organic group and functions as a linking group between at least one of X$^1$ and X$^2$ of the squarylium dye moiety and Z$^0$ which is a group which can be converted to a cation group, or an organic cation group.

As the divalent organic group as Y, examples include a divalent hydrocarbon group optionally containing a heteroatom, and a divalent hydrocarbon group optionally containing O, S, N in the carbon chain. As the divalent organic group as Y, examples include, but are not limited to, a divalent hydrocarbon group and a divalent group which is a combination of a divalent hydrocarbon group and —CONH—, —COO—, —O—, —S—, etc.

The divalent hydrocarbon group may be any of saturated or unsaturated. Also, it may be linear, branched, cyclic, or a combination of cyclic and linear or branched.

The divalent hydrocarbon group preferably has 1 to 30 carbon atoms, more preferably 1 to 2 carbon atoms, still more preferably 1 to 15 carbon atoms, even more preferably 1 to 12 carbon atoms, and particularly preferably 2 to 8 carbon atoms.

From the viewpoint of optical stability, the divalent organic group as Y is preferably a divalent hydrocarbon group.

When the squarylium dye moiety relating to coloration and the cation group are electronically independent, the spread of electron distribution relating to coloration can be suppressed, and narrow absorption with an acute, sharp half-width is given. From this viewpoint, Y is preferably a hydrocarbon group that the carbon atom directly bound to X$^1$ or X$^2$ does not have a π bond, more preferably an aliphatic hydrocarbon group containing a saturated aliphatic hydrocarbon group at a terminal directly bound to X$^1$ or X$^2$ or an aromatic hydrocarbon group containing a saturated aliphatic hydrocarbon group at a terminal directly bound to X$^1$ or X$^2$, and still more preferably an aliphatic saturated hydrocarbon group.

As Y which is preferred from the viewpoint of being inactive against oxidation, reduction, or hydrolysis reaction which can cause dye deterioration, and chemically stably linking $Z^O$ to $X^1$ or $X^2$, examples include, but are not limited to, the following chemical formulae (y-1) to (y-6).

Of them, Y is preferably (y-1), (y-3), (y-5) or (y-6), and more preferably (y-1), (y-3) or (y-5), from the viewpoint of giving narrow absorption with an acute, sharp half-width.

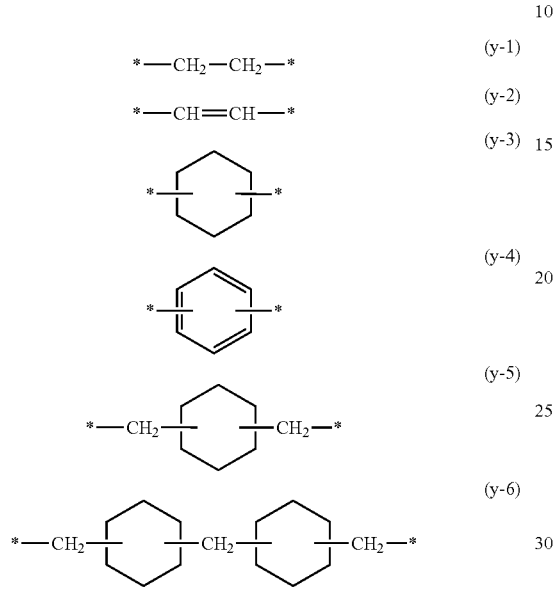

In the formulae, indicates a binding position between $Z^O$ and one of $X^1$ and $X^2$.

In the general formula (3-1), $Z^O$ is a group which can be converted to an organic cation group ($Z^+$), or an organic cation group.

As the group which can be converted to an organic cation group ($Z^+$) as $Z^O$, examples include, but are not limited to, a monovalent nitrogen-containing compound group which can be an onium, a monovalent sulfur-containing compound group which can be an onium, and a monovalent phosphorus-containing compound group which can be an onium. The organic cation group ($Z^+$) is not limited to a protonated onium, and it may be an onium substituted by a hydrocarbon group in place of a proton.

As the nitrogen-containing compound which can be an onium, examples include, but are not limited to, tertiary amine, piperidine, pyrrolidine, pyridine, imidazoline and morpholine.

As the sulfur-containing compound which can be an onium, examples include, but are not limited to, thiol and thioether.

As the phosphorus-containing compound which can be an onium, examples include, but are not limited to, phosphine.

As the organic cation group ($Z^+$) as $Z^O$, examples include an onium structure derived from the group)($Z^O$) which can be converted to the cation group. As the structure, examples include, but are not limited to, an ammonium cation such as a tetraalkylammonium cation and a trialkylammonium cation, a piperidinium cation, a pyrrolidinium cation, a pyridinium cation, an imidazolium cation, a morpholium and a sulfonium cation such as a trialkylsulfonium cation, and a phosphonium cation such as a tetraalkylphosphonium cation.

From the viewpoint of the ease of cationization by protonation and availability of relatively inexpensive raw materials, a tertiary amino group, a pyridyl group, an imidazolyl group, etc., are preferably used as $Z^O$.

From the point of view that the formed onium is stably present as a cation, preferred examples of $Z^O$ include, but are not limited to, the following chemical formulae (z-1) to (z-9):

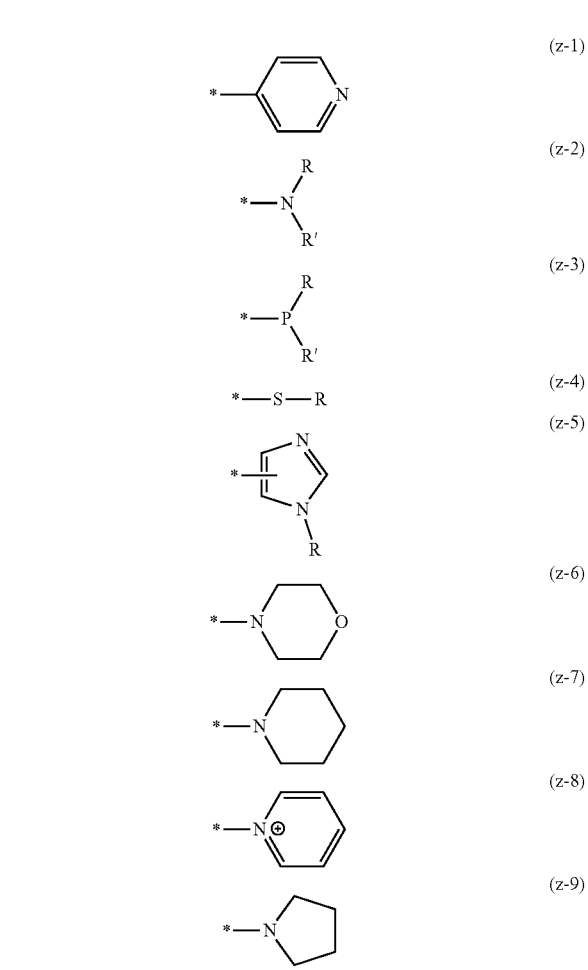

where R and R' each independently represent a hydrogen atom, an alkyl group having 1 to 12 carbon atoms or $-(CH_2CH_2O)_{n'}-R^{120}$; and n' is from 2 to 12; and $R^{120}$ represents a hydrocarbon group having 1 to 4 carbon atoms. In the formulae, * indicates a binding position to Y.

Also, $-(CH_2CH_2O)_{n'}-R^{120}$ in the chemical formulae (z-1) to (z-9) may be the same as $-(CH_2CH_2O)_{n'}-R^{120}$ in the above-mentioned (x-1) to (x-11).

Also, e represents an integer of from 1 to 4. From the viewpoint of forming continuous ion pairs and increasing the molecular weight of the ion pair association for higher resistance to heat and light, e is preferably from 2 to 4, more preferably from 2 to 3, and still more preferably 2.

When e is 2 or more, a plurality of Ys and a plurality of $Z^O$s may be each the same or different.

From the point of view that the symmetry of the electronic state relating to the coloration of the squarylium dye is increased, and the dye gives narrow absorption with an acute, sharp half-width, $X^1$ and $X^2$, a plurality of Ys and a plurality of $Z^O$s are each independently preferably the same.

As the compound represented by the general formula (3-1), examples include, but are not limited to, the following compounds.

TABLE 1

| Compound | $Z^0$ ($X^1$ side) | Y ($X^1$ side) | $X^1$ | $X^2$ | Y ($X^2$ side) | $Z^0$ ($X^2$ side) |
|---|---|---|---|---|---|---|
| (C1) | z-1 | y-1 | x-1 | x-1 | y-1 | z-1 |
| (C2) | z-2 | y-1 | x-1 | x-1 | y-1 | z-2 |
| (C3) | z-3 | y-1 | x-1 | x-1 | y-1 | z-3 |
| (C4) | z-4 | y-1 | x-1 | x-1 | y-1 | z-4 |
| (C5) | z-5 | y-1 | x-1 | x-1 | y-1 | z-5 |
| (C6) | z-6 | y-1 | x-1 | x-1 | y-1 | z-8 |
| (C7) | z-7 | y-1 | x-1 | x-1 | y-1 | z-7 |
| (C8) | z-8 | y-1 | x-1 | x-1 | y-1 | z-8 |
| (C9) | z-9 | y-1 | x-1 | x-1 | y-1 | z-8 |
| (C10) | z-1 | y-2 | x-1 | x-1 | y-2 | z-1 |
| (C11) | z-2 | y-2 | x-1 | x-1 | y-2 | z-2 |
| (C12) | z-3 | y-2 | x-1 | x-1 | y-2 | z-3 |
| (C13) | z-4 | y-2 | x-1 | x-1 | y-2 | z-4 |
| (C14) | z-5 | y-2 | x-1 | x-1 | y-2 | z-5 |
| (C15) | z-6 | y-2 | x-1 | x-1 | y-2 | z-6 |
| (C16) | z-7 | y-2 | x-1 | x-1 | y-2 | z-7 |
| (C17) | z-8 | y-2 | x-1 | x-1 | y-2 | z-8 |
| (C18) | z-9 | y-2 | x-1 | x-1 | y-2 | z-9 |
| (C19) | z-1 | y-3 | x-1 | x-1 | y-3 | z-1 |
| (C20) | z-2 | y-3 | x-1 | x-1 | y-3 | z-2 |
| (C21) | z-3 | y-3 | x-1 | x-1 | y-3 | z-3 |
| (C22) | z-4 | y-3 | x-1 | x-1 | y-3 | z-4 |
| (C23) | z-5 | y-3 | x-1 | x-1 | y-3 | z-5 |
| (C24) | z-6 | y-3 | x-1 | x-1 | y-3 | z-6 |
| (C25) | z-7 | y-3 | x-1 | x-1 | y-3 | z-7 |
| (C26) | z-8 | y-3 | x-1 | x-1 | y-3 | z-8 |
| (C27) | z-9 | y-3 | x-1 | x-1 | y-3 | z-9 |
| (C28) | z-1 | y-4 | x-1 | x-1 | y-4 | z-1 |
| (C29) | z-2 | y-4 | x-1 | x-1 | y-4 | z-2 |
| (C30) | z-3 | y-4 | x-1 | x-1 | y-4 | z-3 |
| (C31) | z-4 | y-4 | x-1 | x-1 | y-4 | z-4 |
| (C32) | x-5 | y-4 | x-1 | x-1 | y-4 | z-5 |
| (C33) | z-6 | y-4 | x-1 | x-1 | y-4 | z-6 |
| (C34) | z-7 | y-4 | x-1 | x-1 | y-4 | z-7 |
| (C35) | z-8 | y-4 | x-1 | x-1 | y-4 | z-8 |
| (C36) | z-9 | y-4 | x-1 | x-1 | y-4 | z-9 |
| (C37) | z-1 | y-5 | x-1 | x-1 | y-5 | z-3 |
| (C38) | z-2 | y-5 | x-1 | x-1 | y-5 | z-2 |
| (C39) | z-3 | y-5 | x-1 | x-1 | y-5 | z-3 |
| (C40) | z-4 | y-5 | x-1 | x-1 | y-5 | z-4 |
| (C41) | z-5 | y-5 | x-1 | x-1 | y-5 | z-5 |
| (C42) | z-6 | y-5 | x-1 | x-1 | y-5 | z-6 |
| (C43) | z-7 | y-5 | x-1 | x-1 | y-5 | z-7 |
| (C44) | z-8 | y-5 | x-1 | x-1 | y-5 | z-8 |
| (C45) | z-9 | y-5 | x-1 | x-1 | y-5 | z-9 |

TABLE 2

| Compound | $Z^0$ ($X^1$ side) | Y ($X^1$ side) | $X^1$ | $X^2$ | Y ($X^2$ side) | $Z^0$ ($X^2$ side) |
|---|---|---|---|---|---|---|
| (C46) | z-1 | y-6 | x-1 | x-1 | y-6 | z-1 |
| (C47) | z-2 | y-6 | x-1 | x-1 | y-6 | z-2 |
| (C48) | z-3 | y-6 | x-1 | x-1 | y-6 | z-3 |
| (C49) | z-4 | y-6 | x-1 | x-1 | y-6 | z-4 |
| (C50) | z-5 | y-6 | x-1 | x-1 | y-6 | z-5 |
| (C51) | z-6 | y-6 | x-1 | x-1 | y-6 | z-6 |
| (C52) | z-7 | y-6 | x-1 | x-1 | y-6 | z-7 |
| (C53) | z-8 | y-6 | x-1 | x-1 | y-6 | z-8 |
| (C54) | z-9 | y-6 | x-1 | x-1 | y-6 | z-9 |
| (C55) | z-1 | y-1 | x-2 | x-2 | y-1 | z-1 |
| (C56) | z-2 | y-1 | x-2 | x-2 | y-1 | z-2 |
| (C57) | z-3 | y-1 | x-2 | x-2 | y-1 | z-3 |
| (C58) | z-4 | y-1 | x-2 | x-2 | y-1 | z-4 |
| (C59) | z-5 | y-1 | x-2 | x-2 | y-1 | z-5 |
| (C60) | z-6 | y-1 | x-2 | x-2 | y-1 | z-6 |
| (C61) | z-7 | y-1 | x-2 | x-2 | y-1 | z-7 |
| (C62) | z-8 | y-1 | x-2 | x-2 | y-1 | z-8 |
| (C63) | z-9 | y-1 | x-2 | x-2 | y-1 | z-9 |
| (C64) | z-1 | y-2 | x-2 | x-2 | y-2 | z-1 |
| (C65) | z-2 | y-2 | x-2 | x-2 | y-2 | z-2 |
| (C66) | z-3 | y-2 | x-2 | x-2 | y-2 | z-3 |
| (C67) | z-4 | y-2 | x-2 | x-2 | y-2 | z-4 |
| (C68) | z-5 | y-2 | x-2 | x-2 | y-2 | z-5 |
| (C66) | z-6 | y-2 | x-2 | x-2 | y-2 | z-6 |
| (C78) | z-7 | y-2 | x-2 | x-2 | y-2 | z-7 |
| (C71) | z-8 | y-2 | x-2 | x-2 | y-2 | z-8 |
| (C72) | z-9 | y-2 | x-2 | x-2 | y-2 | z-9 |
| (C73) | z-1 | y-3 | x-2 | x-2 | y-3 | z-1 |
| (C74) | z-2 | y-3 | x-2 | x-2 | y-3 | z-2 |
| (C76) | z-3 | y-3 | x-2 | x-2 | y-3 | z-3 |
| (C76) | z-4 | y-3 | x-2 | x-2 | y-3 | z-4 |
| (C77) | z-5 | y-3 | x-2 | x-2 | y-3 | z-5 |
| (C73) | z-6 | y-3 | x-2 | x-2 | y-3 | z-6 |
| (C73) | z-7 | y-3 | x-2 | x-2 | y-3 | z-7 |
| (C80) | z-8 | y-3 | x-2 | x-2 | y-3 | z-8 |
| (C81) | z-9 | y-3 | x-2 | x-2 | y-3 | z-9 |
| (C82) | z-1 | y-4 | x-2 | x-2 | y-4 | z-1 |
| (C63) | z-2 | y-4 | x-2 | x-2 | y-4 | z-2 |
| (C84) | z-3 | y-4 | x-2 | x-2 | y-4 | z-3 |
| (C85) | z-4 | y-4 | x-2 | x-2 | y-4 | z-4 |
| (C86) | z-5 | y-4 | x-2 | x-2 | y-4 | z-5 |
| (C87) | z-6 | y-4 | x-2 | x-2 | y-4 | z-6 |
| (C88) | z-7 | y-4 | x-2 | x-2 | y-4 | z-7 |
| (C89) | z-8 | y-4 | x-2 | x-2 | y-4 | z-8 |
| (C90) | z-9 | y-4 | x-2 | x-2 | y-4 | z-9 |

TABLE 3

| Compound | $Z^0$ ($X^1$ side) | Y ($X^1$ side) | $X^1$ | $X^2$ | Y ($X^2$ side) | $Z^0$ ($X^2$ side) |
|---|---|---|---|---|---|---|
| (C91) | z-1 | y-5 | x-2 | x-2 | y-5 | z-1 |
| (C92) | z-2 | y-5 | x-2 | x-2 | y-5 | z-2 |
| (C93) | z-3 | y-5 | x-2 | x-2 | y-5 | z-3 |
| (C94) | z-4 | y-5 | x-2 | x-2 | y-5 | z-4 |
| (C95) | z-5 | y-5 | x-2 | x-2 | y-5 | z-5 |
| (C96) | z-6 | y-5 | x-2 | x-2 | y-5 | z-6 |
| (C97) | z-7 | y-5 | x-2 | x-2 | y-5 | z-7 |
| (C98) | z-8 | y-5 | x-2 | x-2 | y-5 | z-8 |
| (C99) | z-9 | y-5 | x-2 | x-2 | y-5 | z-9 |
| (C100) | z-1 | y-6 | x-2 | x-2 | y-6 | z-1 |
| (C101) | z-2 | y-6 | x-2 | x-2 | y-6 | z-2 |
| (C102) | z-3 | y-6 | x-2 | x-2 | y-6 | z-3 |
| (C103) | z-4 | y-6 | x-2 | x-2 | y-6 | z-4 |
| (C104) | z-5 | y-6 | x-2 | x-2 | y-6 | z-5 |
| (C105) | z-6 | y-6 | x-2 | x-2 | y-6 | z-6 |
| (C106) | z-7 | y-6 | x-2 | x-2 | y-6 | z-7 |
| (C107) | z-8 | y-6 | x-2 | x-2 | y-6 | z-8 |
| (C108) | z-9 | y-6 | x-2 | x-2 | y-6 | z-9 |
| (C109) | z-1 | y-1 | x-3 | x-3 | y-1 | z-1 |
| (C110) | z-2 | y-1 | x-3 | x-3 | y-1 | z-2 |
| (C111) | z-5 | y-1 | x-3 | x-3 | y-1 | z-5 |
| (C112) | z-8 | y-1 | x-3 | x-3 | y-1 | z-8 |
| (C113) | z-1 | y-3 | x-3 | x-3 | y-3 | z-1 |
| (C114) | z-2 | y-3 | x-3 | x-3 | y-3 | z-2 |
| (C115) | z-5 | y-3 | x-3 | x-3 | y-3 | z-5 |
| (C116) | z-8 | y-3 | x-3 | x-3 | y-3 | z-8 |
| (C117) | z-1 | y-5 | x-3 | x-3 | y-5 | z-1 |
| (C118) | z-2 | y-5 | x-3 | x-3 | y-5 | z-2 |
| (C119) | z-5 | y-5 | x-3 | x-3 | y-5 | z-5 |
| (C120) | z-8 | y-5 | x-3 | x-3 | y-5 | z-8 |
| (C121) | z-1 | y-1 | x-4 | x-4 | y-1 | z-1 |
| (C122) | z-2 | y-1 | x-4 | x-4 | y-1 | z-2 |
| (C123) | z-5 | y-1 | x-4 | x-4 | y-1 | z-5 |
| (C124) | z-8 | y-1 | x-4 | x-4 | y-1 | z-8 |
| (C125) | z-1 | y-3 | x-4 | x-4 | y-3 | z-1 |
| (C126) | z-2 | y-3 | x-4 | x-4 | y-3 | z-2 |
| (C127) | z-5 | y-3 | x-4 | x-4 | y-3 | z-5 |
| (C128) | z-8 | y-3 | x-4 | x-4 | y-3 | z-8 |
| (C129) | z-1 | y-5 | x-4 | x-4 | y-5 | z-1 |
| (C130) | z-2 | y-5 | x-4 | x-4 | y-5 | z-2 |
| (C131) | z-5 | y-5 | x-4 | x-4 | y-5 | z-5 |
| (Cl32) | z-8 | y-5 | x-4 | x-4 | y-5 | z-8 |
| (C133) | z-1 | y-1 | x-5 | x-5 | y-1 | z-1 |
| (C134) | z-2 | y-1 | x-5 | x-5 | y-1 | z-2 |
| (C135) | z-5 | y-1 | x-5 | x-5 | y-1 | z-5 |

TABLE 4

| Compound | $Z^0$ ($X^1$ side) | Y ($X^1$ side) | $X^1$ | $X^2$ | Y ($X^2$ side) | $Z^0$ ($X^2$ side) |
|---|---|---|---|---|---|---|
| (C136) | z-8 | y-1 | x-5 | x-5 | y-1 | z-8 |
| (C137) | z-1 | y-3 | x-5 | x-5 | y-3 | z-1 |
| (C138) | z-2 | y-3 | x-5 | x-5 | y-3 | z-2 |
| (C139) | z-5 | y-3 | x-5 | x-5 | y-3 | z-5 |
| (C140) | z-8 | y-3 | x-5 | x-5 | y-3 | z-8 |
| (C141) | z-1 | y-5 | x-5 | x-5 | y-5 | z-1 |
| (C142) | z-2 | y-5 | x-5 | x-5 | y-5 | z-2 |
| (C143) | z-5 | y-5 | x-5 | x-5 | y-5 | z-5 |
| (C144) | z-8 | y-5 | x-5 | x-5 | y-5 | z-8 |
| (C145) | z-1 | y-1 | x-6 | x-6 | y-1 | z-1 |
| (C146) | z-2 | y-1 | x-6 | x-6 | y-1 | z-2 |
| (C147) | z-5 | y-1 | x-6 | x-6 | y-1 | z-5 |
| (C148) | z-8 | y-1 | x-6 | x-6 | y-1 | z-8 |
| (C149) | z-1 | y-3 | x-6 | x-6 | y-3 | z-1 |
| (C150) | z-2 | y-3 | x-6 | x-6 | y-3 | z-2 |
| (C151) | z-5 | y-3 | x-6 | x-6 | y-3 | z-5 |
| (C152) | z-8 | y-3 | x-6 | x-6 | y-3 | z-8 |
| (C153) | z-1 | y-5 | x-6 | x-6 | y-5 | z-1 |
| (C154) | z-2 | y-5 | x-6 | x-6 | y-5 | z-2 |
| (C155) | z-5 | y-5 | x-6 | x-6 | y-5 | z-5 |
| (C158) | z-8 | y-5 | x-6 | x-6 | y-5 | z-8 |
| (C157) | z-1 | y-1 | x-7 | x-7 | y-1 | z-1 |
| (C158) | z-2 | y-1 | x-7 | x-7 | y-1 | z-2 |
| (C159) | z-5 | y-1 | x-7 | x-7 | y-1 | z-5 |
| (C160) | z-8 | y-1 | x-7 | x-7 | y-1 | z-8 |
| (C161) | z-1 | y-3 | x-7 | x-7 | y-3 | z-1 |
| (C162) | z-2 | y-3 | x-7 | x-7 | y-3 | z-2 |
| (C163) | z-5 | y-3 | x-7 | x-7 | y-3 | z-5 |
| (C164) | z-8 | y-3 | x-7 | x-7 | y-3 | z-8 |
| (C165) | z-1 | y-5 | x-7 | x-7 | y-5 | z-1 |
| (C166) | z-2 | y-5 | x-7 | x-7 | y-5 | z-2 |
| (C167) | z-5 | y-5 | x-7 | x-7 | y-5 | z-5 |
| (C168) | z-8 | y-5 | x-7 | x-7 | y-5 | z-8 |
| (C169) | z-1 | y-1 | x-8 | x-8 | y-1 | z-1 |
| (C170) | z-2 | y-1 | x-8 | x-8 | y-1 | z-2 |
| (C171) | z-5 | y-1 | x-8 | x-8 | y-1 | z-5 |
| (C172) | z-8 | y-1 | x-8 | x-8 | y-1 | z-8 |
| (C173) | z-1 | y-3 | x-8 | x-8 | y-3 | z-1 |
| (C174) | z-2 | y-3 | x-8 | x-8 | y-3 | z-2 |
| (C175) | z-5 | y-3 | x-8 | x-8 | y-3 | z-5 |
| (C176) | z-8 | y-3 | x-8 | x-8 | y-3 | z-8 |
| (C177) | z-1 | y-5 | x-8 | x-8 | y-5 | z-1 |
| (C178) | z-2 | y-5 | x-8 | x-8 | y-5 | z-2 |
| (C179) | z-5 | y-5 | x-8 | x-8 | y-5 | z-5 |
| (C180) | z-8 | y-5 | x-8 | x-8 | y-5 | z-8 |

TABLE 5

| Compound | $Z^0$ ($X^1$ side) | Y ($X^1$ side) | $X^1$ | $X^2$ | Y ($X^2$ side) | $Z^0$ ($X^2$ side) |
|---|---|---|---|---|---|---|
| (C181) | z-1 | y-1 | x-9 | x-9 | y-1 | z-1 |
| (C182) | z-2 | y-1 | x-9 | x-9 | y-1 | z-2 |
| (C183) | z-5 | y-1 | x-9 | x-9 | y-1 | z-5 |
| (C184) | z-8 | y-1 | x-9 | x-9 | y-1 | z-8 |
| (C185) | z-1 | y-3 | x-9 | x-9 | y-3 | z-1 |
| (C186) | z-2 | y-3 | x-9 | x-9 | y-3 | z-2 |
| (C187) | z-5 | y-3 | x-9 | x-9 | y-3 | z-5 |
| (C188) | z-8 | y-3 | x-9 | x-9 | y-3 | z-8 |
| (C189) | z-1 | y-5 | x-9 | x-9 | y-5 | z-1 |
| (C190) | z-2 | y-5 | x-9 | x-9 | y-5 | z-2 |
| (C191) | z-5 | y-5 | x-9 | x-9 | y-5 | z-5 |
| (C192) | z-8 | y-5 | x-9 | x-9 | y-5 | z-8 |
| (C193) | z-1 | y-1 | x-10 | x-10 | y-1 | z-1 |
| (C194) | z-2 | y-1 | x-10 | x-10 | y-1 | z-2 |
| (C195) | z-5 | y-1 | x-10 | x-10 | y-1 | z-5 |
| (C196) | z-8 | y-1 | x-10 | x-10 | y-1 | z-8 |
| (C197) | z-1 | y-3 | x-10 | x-10 | y-3 | z-1 |
| (C198) | z-2 | y-3 | x-10 | x-10 | y-3 | z-2 |
| (C199) | z-5 | y-3 | x-10 | x-10 | y-3 | z-5 |
| (C200) | z-8 | y-3 | x-10 | x-10 | y-3 | z-8 |
| (C201) | z-1 | y-5 | x-10 | x-10 | y-5 | z-1 |
| (C202) | z-2 | y-5 | x-10 | x-10 | y-5 | z-2 |
| (C203) | z-5 | y-5 | x-10 | x-10 | y-5 | z-5 |
| (C204) | z-8 | y-5 | x-10 | x-10 | y-5 | z-8 |
| (C205) | z-1 | y-1 | x-11 | x-11 | y-1 | z-1 |
| (C206) | z-2 | y-1 | x-11 | x-11 | y-1 | z-2 |
| (C207) | z-5 | y-1 | x-11 | x-11 | y-1 | z-5 |
| (C208) | z-8 | y-1 | x-11 | x-11 | y-1 | z-8 |
| (C209) | z-1 | y-3 | x-11 | x-11 | y-3 | z-1 |
| (C210) | z-2 | y-3 | x-11 | x-11 | y-3 | z-2 |
| (C211) | z-5 | y-3 | x-11 | x-11 | y-3 | z-5 |
| (C212) | z-8 | y-3 | x-11 | x-11 | y-3 | z-8 |
| (C213) | z-1 | y-5 | x-11 | x-11 | y-5 | z-1 |
| (C214) | z-2 | y-5 | x-11 | x-11 | y-5 | z-2 |
| (C215) | z-5 | y-5 | x-11 | x-11 | y-5 | z-5 |
| (C216) | z-8 | y 5 | x-11 | x-11 | y-5 | z-8 |
| (C217) | z-1 | y-1 | x-1 | x-10 | y-1 | z-1 |
| (C218) | z-2 | y-1 | x-1 | x-10 | y-1 | z-2 |
| (C219) | z-5 | y-1 | x-1 | x-10 | y-1 | z-5 |
| (C220) | z-8 | y-1 | x-1 | x-10 | y-1 | z-8 |
| (C221) | z-1 | y-3 | x-1 | x-10 | y-3 | z-1 |
| (C222) | z-2 | y-3 | x-1 | x-10 | y-3 | z-2 |
| (C223) | z-5 | y-3 | x-1 | x-10 | y-3 | z-5 |
| (C224) | z-8 | y-3 | x-1 | x-10 | y-3 | z-8 |

TABLE 6

| Compound | $Z^0$ ($X^1$ side) | Y ($X^1$ side) | $X^1$ | $X^2$ | Y ($X^2$ side) | $Z^0$ ($X^2$ side) |
|---|---|---|---|---|---|---|
| (C225) | z-1 | y-5 | x-1 | x-10 | y-5 | z-1 |
| (C226) | z-2 | y-5 | x-1 | x-10 | y-5 | z-2 |
| (C227) | z-5 | y-5 | x-1 | x-10 | y-5 | z-5 |
| (C228) | z-8 | y-5 | x-1 | x-10 | y-5 | z-8 |
| (C229) | z-1 | y-1 | x-1 | x-11 | y-1 | z-1 |
| (C230) | z-2 | y-1 | x-1 | x-11 | y-1 | z-2 |
| (C231) | z-5 | y-1 | x-1 | x-11 | y-1 | z-5 |
| (C232) | z-8 | y-1 | x-1 | x-11 | y-1 | z-8 |
| (C233) | z-1 | y-3 | x-1 | x-11 | y-3 | z-1 |
| (C234) | z-2 | y-3 | x-1 | x-11 | y-3 | z-2 |
| (C235) | z-5 | y-3 | x-1 | x-11 | y-3 | z-5 |
| (C236) | z-8 | y-3 | x-1 | x-11 | y-3 | z-8 |
| (C237) | z-1 | y-5 | x-1 | x-11 | y-5 | z-1 |
| (C238) | z-2 | y-5 | x-1 | x-11 | y-5 | z-2 |
| (C239) | z-5 | y-5 | x-1 | x-11 | y-5 | z-5 |
| (C240) | z-8 | y-5 | x-1 | x-11 | y-5 | z-8 |

In the color material used in the disclosed embodiments, the organic dye forms the salt-forming compound with the heteropolyoxometalate having an oxidation-reduction potential larger than −0.3 V relative to the silver/silver chloride electrode.

The organic dye is cationized by the proton ($H^+$) of the heteropolyoxometalate or other cation, and as the counter anion thereof, the anion of the above-specified heteropolyoxometalate is used. By using, as the counter anion, such a heteropolyoxometalate anion that the oxidation-reduction potential is larger than the specific value, the heteropolyoxometalate having a property of being easily reduced absorbs the energy which is generated when the organic dye is photoexcited and returns to the ground state, whereby the singlet oxygen generation can be suppressed during light irradiation, and the light resistance of the color material is further increased.

The heteropolyoxometalate anion is represented by the formula $(L_l M_m O_n)^{a-}$ (where a is a number of 2 or more). In the ionic formula, L represents heteroatom; M represents polyatom, O represents oxygen atom; and l, m and n represent the composition ratio of each atom. As the polyatom M, examples include, but are not limited to, Mo (molybdenum), W (tungsten), V (vanadium), Ti (titanium) and Nb (niobium). Two or more kinds of transition metal atoms may be contained in the polyatom M.

The heteroatom L is not particularly limited. As the heteroatom L, examples include, but are not limited to, Si, P, As, S, Fe and Co. A counter cation such as Na$^+$ and H$^+$ may be contained in a part thereof.

In the disclosed embodiments, as the heteropolyoxometalate which has an oxidation-reduction potential larger than −0.3 V relative to the silver/silver chloride electrode, examples include, but are not limited to, $H_4SiMo_{12}O_{40}$ (−0.232 V), $H_3PW_6Mo_6O_{40}$ (−0.197 V), $H_3PW_3Mo_9O_{40}$ (−0.153 V), $H_3PMo_{12}O_{40}$ (−0.082 V), $H_6PW_9V_3O_{40}$ (0.045 V), $H_5PW_{10}V_2O_{40}$ (0.050 V), $H_6PMo_9V_3O_{40}$ (0.168 V), $H_3AsMo_{12}O_{40}$ (0.183 V), $H_4PW_{11}V_1O_{40}$ (0.224 V), $H_5PMo_{10}V_2O_{40}$ (0.233 V) and $H_4PMo_{11}V_1O_{40}$ (0.261 V).

The oxidation-reduction potential specified in the disclosed embodiments refers to a value obtained by measuring a heteropolyoxometalate aqueous solution with the silver/silver chloride standard electrode (a KCl saturated aqueous solution) using platinum as the working electrode. As the heteropolyoxometalate aqueous solution, an aqueous solution obtained by dissolving 1 mM heteropolyoxometalate in a 0.5 M sodium sulfate electrolyte aqueous solution, can be used.

For the oxidation-reduction potential of the heteropolyoxometalate on the above-described measurement condition, the values of the oxidation-reduction potentials (V) in FIG. 9 of Journal of Molecular Catalysis A: Chemical 212 (2004) 229-236, can be used as reference. The above-described values in parentheses are the values described in the reference.

In the disclosed embodiments, for the heteropolyoxometalate which has an oxidation-reduction potential larger than −0.3 V relative to the silver/silver chloride electrode, the oxidation-reduction potential is preferably 0 V or more relative to the silver/silver chloride electrode, from the viewpoint of increasing the light resistance.

In the disclosed embodiments, the heteropolyoxometalate which has an oxidation-reduction potential larger than −0.3 V relative to the silver/silver chloride electrode, preferably contains vanadium, from the point of view that the oxidation-reduction potential increases and, especially, the light resistance increases.

In the color material, as the heteropolyoxometalate which has an oxidation-reduction potential larger than −0.3 V relative to the silver/silver chloride electrode, one kind of heteropolyoxometalate may be used solely, or a combination of two or more kinds of heteropolyoxometalates may be used.

In the color material used in the disclosed embodiments, from the viewpoint of narrowing the half-width of an absorption spectrum or transmission spectrum, the salt-forming compound is preferably the salt-forming compound represented by the following general formula (1), for example:

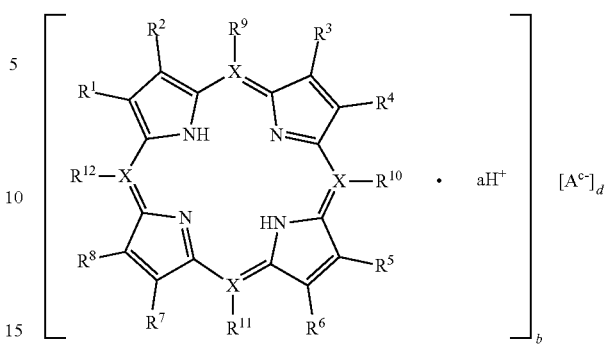

General Formula (1)

where $R^1$ to $R^{12}$ each independently represent a hydrogen atom, a halogen atom, a nitro group, a cyano group, a hydroxy group, an amino group, a carboxyl group, a sulfonic acid group, an alkoxy group optionally containing a substituent, an aryloxy group optionally containing a substituent, a monoalkylamino group optionally containing a substituent, a dialkylamino group optionally containing a substituent, an alkylthio group optionally containing a substituent, an arylthio group optionally containing a substituent, an alkyl group optionally containing a substituent or an aromatic ring group optionally containing a substituent; X represents a carbon atom or a nitrogen atom; and when X is a nitrogen atom, $R^9$ to $R^{12}$ are not present; or $R^1$ and $R^2$, $R^3$ and $R^4$, $R^5$ and $R^6$, $R^7$ and $R^8$ may each independently form a ring, and the ring may contain an unsaturated bond;

$A^{c-}$ represents a heteropolyoxometalate anion which is a c-valent anion and which has an oxidation-reduction potential larger than −0.3 V relative to the silver/silver chloride electrode; a, b and c are each an integer of 2 or more; d is an integer of 1 or more; and the salt-forming compound is a normal salt that a×b=c×d.

$R^1$ to $R^{12}$ of the general formula (1) will not be described here, since they may be the same as $R^1$ to $R^{12}$ of the general formula (1-1).

Since b is an integer of 2 or more, two or more compounds represented by the general formula (1-1) are contained in the salt-forming compound of the general formula (1). In the salt-forming compound, as the contained two or more compounds represented by the general formula (1-1), one kind of compound may be solely, or a combination of two or more kinds of compounds may be used. Accordingly, a plurality of $R^1$s, a plurality of $R^2$s, a plurality of $R^3$s, a plurality of $R^4$s, a plurality of $R^5$s, a plurality of $R^6$s, a plurality of Fes, a plurality of $R^8$s, a plurality of $R^9$s, a plurality of $R^{10}$s, a plurality of $R^{11}$s and a plurality of $R^{12}$s may be each the same or different. From the viewpoint of suppressing the broadening of an absorption peak due to the interference of the dyes, in the salt-forming compound, the contained two or more compounds represented by the general formula (1-1) are preferably one kind of compounds, and a plurality of $R^1$s, a plurality of $R^2$s, a plurality of $R^3$s, a plurality of $R^4$s, a plurality of $R^5$s, a plurality of $R^6$s, a plurality of $R^7$s, a plurality of $R^8$s, a plurality of $R^9$s, a plurality of $R^{10}$s, a plurality of $R^{11}$s and a plurality of $R^{12}$s are each preferably the same.

Also, $A^{c-}$ is an anion of the heteropolyoxometalate. As $A^{c-}$, examples include, but are not limited to, $[SiMo_{12}O_{40}]^{4-}$, $[PW_9Mo_3O_{40}]^{3-}$, $[PW_6Mo_6O_{40}]^{3-}$, $[PW_3Mo_9O_{40}]^{3-}$, $[PMo_{12}O_{40}]^{3-}$, $[PW_9V_3O_{40}]^{6-}$, $[PW_{10}V_2O_{40}]^{5-}$, $[PMo_9V_3O_{40}]^{6-}$, $[AsMo_{12}O_{40}]^{3-}$, $[PW_{11}V_1O_{40}]^{4-}$, $[PMo_{10}V_2O_{40}]^{5-}$ and $[PMo_{11}V_1O_{40}]^{4-}$.

For the heteropolyoxometalate which has an oxidation-reduction potential larger than −0.3 V relative to the silver/silver chloride electrode, the oxidation-reduction potential is preferably 0 V or more relative to the silver/silver chloride electrode, from the viewpoint of increasing the light resistance.

The heteropolyoxometalate which has an oxidation-reduction potential larger than −0.3 V relative to the silver/silver chloride electrode, preferably contains vanadium, from the point of view that the oxidation-reduction potential increases and, especially, the light resistance increases.

A plurality of $A^{c-}$s may be each the same or different.

In the color material used in the disclosed embodiments, the salt-forming compound is preferably the salt-forming compound represented by the following general formula (3), for example:

General Formula (3)

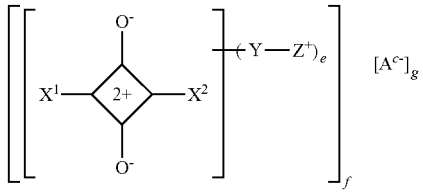

where $X^1$ and $X^2$ each independently represent an aromatic ring group optionally containing a substituent; Y represents a divalent organic group; $Z^+$ represents an organic cation group; e represents an integer of from 1 to 4; and when e is 2 or more, a plurality of Ys and a plurality of $Z^+$s may be each the same or different;

$A^{c-}$ represents a heteropolyoxometalate anion which is a c-valent anion and which has an oxidation-reduction potential larger than −0.3 V relative to the silver/silver chloride electrode; f and c are each an integer of 2 or more; g is an integer of 1 or more; and the salt-forming compound is a normal salt that f×e=c×g.

$X^1$, $X^2$, Y and e of the general formula (3) will not be described here, since they may be the same as $X^1$, $X^2$, Y and e of the general formula (3-1).

$Z^+$ of the general formula (3) represents an organic cation group.

As $Z^+$ (an organic cation group), examples include an onium structure derived from the group)($Z^0$) which can be converted to the cation group, and $Z^+$ (the organic cation group) may be the same as that described in $Z^0$ of the general formula (3-1). From the viewpoint of availability of raw materials, $Z^+$ is preferably a protonated, nitrogen-containing organic cation.

Since f is 2 or more, two $X^1$s and two $X^2$s are contained. A plurality of $X^1$s and a plurality of $X^2$s may be each the same or different. From the point of view that the symmetry of the components or association states of the associations formed by the ion pairs is increased, and a sharper absorption spectrum or transmission spectrum is obtained, a plurality of $X^1$s and a plurality of $X^2$s may be each the same.

$A^{c-}$ represents a heteropolyoxometalate anion which is a c-valent anion and which has an oxidation-reduction potential larger than −0.3 V relative to the silver/silver chloride electrode. As the heteropolyoxometalate anion, examples include those exemplified above as the heteropolyoxometalate anion as $A^{c-}$ of the general formula (1).

A plurality of $A^{c-}$s may be each the same or different.

<Salt-Forming Compound Production Method>

The salt-forming compound used in the disclosed embodiments can be obtained by, for example, mixing in the solvent the organic dye of the desired structure with the heteropolyoxometalate which has an oxidation-reduction potential larger than −0.3 V relative to the silver/silver chloride electrode, and heating the mixture as needed.

The organic dye of the desired structure can be synthesized with reference to the methods described in the above-described Japanese laid-open patent applications, etc., for example.

The method for producing the compound represented by the general formula (3-1) is not particularly limited. As the production method, examples include the following method: by use of a carbon-carbon forming reaction such as a reaction using a Grignard reagent, a coupling reaction using a palladium catalyst, an Ullmann reaction, a Friedel-Crafts reaction, an Aldol reaction and a Wittig reaction, the compound that derives $X^1$ and $X^2$ in which Y and $Z^0$ are introduced, is reacted with squaric acid in the presence of a base.

Also, a commercially-available product may be used. As the commercially-available product, examples include, but are not limited to, tetraphenylporphyrin manufactured by Tokyo Chemical Industry Co., Ltd., 5,10,15,20-tetrakis(4-sulfophenyl)porphyrin hydrate, α,β,γ,Δ-tetrakis(1-methylpyridinium-4-yl)porphyrin p-toluenesulfonate, tetrakis(4-carboxyphenyl) porphyrin, oxo[5,10,15,20-tetra(4-pyridyl) porphyrinato]titanium(IV), 5-(4-carboxyphenyl)-10,15,20-triphenylporphyrin, 5,15-diphenylporphyrin, 2,3,7,8,12,13,17,18-octaethylporphyrin, 2,3,7,8,12,13,17,18-octafluoro-5,10,15,20-tetrakis(pentafluorophenyl)porphyrin, 5,10,15,20-tetrakis(4-carboxymethyloxyphenyl)porphyrin, 5,10,15,20-tetrakis(2,4,6-trimethylphenyl)porphyrin, 5,10,15,20-tetrakis(3,5-dihydroxyphenyl)porphyrin, 5,10,15,20-tetrakis(3,5-dimethoxyphenyl)porphyrin, 5,10,15,20-tetra(4-pyridyl)porphyrin, 2,7,12,17-tetra-tert-butyl-5,10,15,20-tetraaza-21H,23H-porphyrin manufactured by Aldrich, 1,4,8,11,15,18,22,25-octabutoxy-29H,31H-phthalocyanine, 2,11,20,29-tetra-tert-butyl-2,3-naphthalocyanine, 2,3,9,10,16,17,23,24-octakis(octyloxy)-29H,31H-phthalocyanine, 2,9,16,23-tetra-tert-butyl-29H,31H-phthalocyanine, 29H,31H-phthalocyanine, and 5,9,14,18,23,27,32,36-octabutoxy-2,3-naphthalocyanine.

In the disclosed embodiments, as the color material, one kind of color material can be used solely, or a combination of two or more kinds of color materials can be used.

In the color material dispersion liquid of the disclosed embodiments, the content of the color material is not particularly limited. From the viewpoint of dispersibility and dispersion stability, the content of the color material is preferably in a range of from 5% by mass to 40% by mass of the total amount of the color material dispersion liquid, more preferably in a range of from 10% by mass to 20% by mass thereof.

(Dispersant)

In the color material dispersion liquid of the disclosed embodiments, the color material is dispersed in the solvent and used. In the disclosed embodiments, the dispersant is used to sufficiently disperse the color material. The dispersant may be appropriately selected from dispersants which are conventionally used as pigment dispersants. As the dispersant, for example, a cationic, anionic, nonionic, amphoteric, silicone-based or fluorine-based surfactant can be used. Of surfactants, a polymer surfactant (a polymer dispersant) is preferred from the viewpoint of uniform and fine dispersion.

As the polymer dispersant, examples include, but are not limited to, (co)polymers of unsaturated carboxylic acid esters such as polyacrylic acid ester; (co)polymers of unsaturated carboxylic acids such as polyacrylic acid; (partial) amine salts, (partial)ammonium salts and (partial)alkylamine salts of (co)polymers of unsaturated carboxylic acids such as polyacrylic acid; (co)polymers of hydroxyl group-containing unsaturated carboxylic acid esters such as hydroxyl group-containing polyacrylic acid ester, and modified products thereof; polyurethanes; unsaturated polyamides; polysiloxanes; long-chain polyaminoamide phosphates; polyethyleneimine derivatives (amide and salts thereof, obtained by reaction of poly(lower alkyleneimine) and polyester containing a free carboxyl group); polyallylamine derivatives (reaction products obtained by reacting polyallylamine and one or more compounds selected from the following three kinds of compounds: polyester containing a free carboxyl group, polyamide and a co-condensate of ester and amide (polyester amide)).

The polymer dispersant is preferably an acidic dispersant, from the point of view that the color material being the salt-forming compound can be suitably dispersed, and excellent dispersion stability is obtained.

The acidic dispersant refers to a dispersant that the acidic group amount is larger than the basic group amount, and a basic dispersant refers to a dispersant that the basic group amount is larger than the acidic group amount.

As the acidic dispersant used in the disclosed embodiments, a resin that the acidic group amount is 80% by mole or more when the total amount of the acidic and basic groups is determined as 100% by mole, is preferred, and a resin which substantially contains an acidic group and which does not contain a basic group, is more preferred.

From the viewpoint of the dispersion stability of the color material, the acidic dispersant used in the disclosed embodiments is preferably such that it has an acid value and does not have an amine value.

In the case of using the acidic dispersant, the acidic dispersant is estimated to not only sufficiently disperse the color material being the salt-forming compound but also have the function of allowing the color material being the salt-forming compound to be stably present in the state of ion pair.

The acid value of the acidic dispersant used in the disclosed embodiments is preferably 30 mgKOH/g or more, more preferably 60 mgKOH/g or more, and still more preferably 90 mgKOH/g or more.

The amine value of the acidic dispersant used in the present invention is preferably 0 mgKOH/g.

The acid value represents the mass (mg) potassium hydroxide needed to neutralize the acidic component contained in per gram of the solid content of the dispersant, and it is a value measured by the method described in JIS K 0070.

The amine value represents the mass (mg) of potassium hydroxide, which is an equivalent to the amount of hydrochloric acid needed to neutralize one gram of the solid content of the dispersant, and it is a value measured by the method described in JIS K 7237.

As the acidic group of the acidic dispersant used in the disclosed embodiments, examples include, but are not limited to, a carboxy group, a phosphoric acid group and a salt thereof, and a sulfonic acid group and a salt thereof.

As the acidic dispersant, examples include, but are not limited to, a block or graft copolymer containing an acidic group; a salt of a block copolymer containing an acidic group with an organic cation such as an alkylammonium salt; a hydroxyl group-containing carboxylic acid ester; a fatty acid salt such as a salt of a high-molecular-weight polycarboxylic acid; a polyether ester-type anionic surfactant; a naphthalene sulfonic acid formalin condensate salt; a phosphoric acid ester such as a polyoxyethylene alkyl phosphoric acid ester and a salt thereof; alkyl sulfate ester salt; a polyoxyethylene alkyl ether sulfate ester salt; and a sulfonic acid salt such as an alkyl benzene sulfonic acid salt.

As commercially-available products of the acidic dispersant, examples include, but are not limited to, DISPERBYKR-103, DISPERBYKR-110, DISPERBYK-118, AJISPER PN411 and AJISPER PA111.

Of acidic dispersants, from the viewpoint of the dispersibility and dispersion stability of the color material, the dispersant is more preferably a polymer containing one or more selected from the constitutional unit represented by the following general formula (I) and the constitutional unit represented by the following general formula (I'):

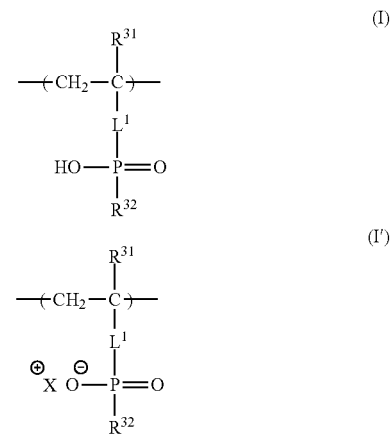

where $L^1$ is a direct bond or a divalent linking group; $R^{31}$ is a hydrogen atom or a methyl group; $R^{32}$ is a hydroxyl group, a hydrocarbon group or a monovalent group represented by —[CH($R^{33}$)—CH($R^{34}$)—O]$_{x1}$—$R^{35}$, —[(CH$_2$)$_{y1}$—O]$_{z1}$—$R^{35}$ or —O—$R^{36}$; $R^{36}$ is a hydrocarbon group or a monovalent group represented by —[CH($R^{33}$)—CH($R^{34}$)—O]$_{x1}$—$R^{35}$, —[(CH$_2$)$_{y1}$—O]$_{z1}$—$R^{35}$, —C($R^{37}$)($R^{38}$)—C($R^{39}$)($R^{40}$)—OH or —CH$_2$—C($R^{41}$)($R^{42}$)—CH$_2$—OH;

$R^{33}$ and $R^{34}$ are each independently a hydrogen atom or a methyl group; $R^{35}$ is a hydrogen atom, a hydrocarbon group or a monovalent group represented by —CHO, —CH$_2$CHO, —CO—CH=CH$_2$, —CO—C(CH$_3$)=CH$_2$ or —CH$_2$COO$R^{43}$; $R^{43}$ is a hydrogen atom or an alkyl group having 1 to 5 carbon atoms; $R^{37}$, $R^{38}$, $R^{39}$, $R^{40}$, $R^{41}$ and $R^{42}$ are each independently a hydrogen atom, a hydrocarbon group or a hydrocarbon group containing one or more selected from an ether bond and an ester bond; $R^{37}$ and $R^{39}$ may be bound to each other to form a ring structure; when the ring structure is formed, the ring structure may further contain a substituent $R^{44}$, and $R^{44}$ is a hydrocarbon group or a hydrocarbon group containing one or more selected from an ether bond and an ester bond; the hydrocarbon group may contain a substituent; and in the general formula (I'), $X^+$ represents an organic cation, and x1, y1 and z1 represent an integer of from 1 to 18, an integer of from 1 to 5, and an integer of from 1 to 18, respectively.

In the general formulae (I) and (I'), $L^1$ is a direct bond or a divalent linking group. When $L^1$ is a direct bond, it means that a phosphorus atom is directly bound to the carbon atom of the main chain, not through the linking group.

The divalent linking group as $L^1$ is not particularly limited, as long as the carbon atom of the main chain and the phosphorus atom can be linked to each other. As the divalent linking group as $L^1$, examples include, but are not limited to, a linear, branched or cyclic alkylene group, a linear, branched or cyclic alkylene group containing a hydroxyl group, an arylene group, a —CONH— group, a —COO— group, a —NHCOO— group, an ether group (a —O— group), a thioether group (a —S— group) and combinations thereof. In the present invention, the binding direction of the divalent linking group may be any direction. That is, when —CONH— is contained in the divalent linking group, —CO may be on the carbon atom side of the main chain, and —NH may be on the phosphorus atom side of the side chain. To the contrary, —NH may be on the carbon chain side of the main chain, and —CO may be on the phosphorus atom side of the side chain.

From the viewpoint of dispersibility, $L^1$ of the general formulae (I) and (I') is preferably a divalent linking group containing a —CONH— group or a —COO— group, and more preferably a —CONH-$L^{1'}$ group or a —COO-$L^{1'}$ group. $L^{1'}$ is an alkylene group having 1 to 8 carbon atoms and optionally containing a hydroxyl group, —[CH($R^a$)—CH($R^b$)—O]$_x$—, —[(CH$_2$)$_y$—O]$_z$—(CH$_2$)$_y$—O—, or —[CH($R^c$)]$_w$—O—, and $R^a$, $R^b$ and $R^c$ are preferably each independently a hydrogen atom, a methyl group or a hydroxyl group.

The alkylene group having 1 to 8 carbon atoms as $L^{1'}$ may be any of linear, branched or cyclic. As the alkylene group having 1 to 8 carbon atoms, examples include, but are not limited to, a methylene group, an ethylene group, a trimethylene group, a propylene group, various kinds of butylene groups, various kinds of pentylene groups, various kinds of hexylene groups, and various kinds of octylene groups. Part of the hydrogen may be substituted by a hydroxyl group.

Also, x is an integer of from 1 to 18, preferably an integer of from 1 to 4, and more preferably an integer of from 1 to 2; y is an integer of from 1 to 5, preferably an integer of from 1 to 4, and more preferably 2 or 3; z is an integer of from 1 to 18, preferably an integer of from 1 to 4, and more preferably an integer of from 1 to 2; and w is an integer of from 1 to 18, and preferably an integer of from 1 to 4.

Preferred examples of $L^1$ of the general formulae (I) and (I') include, but are not limited to, —COO—CH$_2$CH(OH)CH$_2$—O—, —COO—CH$_2$CH$_2$—O—CH$_2$CH(OH)CH$_2$—O—, and —COO—CH$_2$C(CH$_2$CH$_3$)(CH$_2$OH)CH$_2$—O—.

As the hydrocarbon group as $R^{32}$, examples include, but are not limited to, an alkyl group having 1 to 18 carbon atoms, an alkenyl group having 2 to 18 carbon atoms, an aralkyl group and an aryl group.

The alkyl group having 1 to 18 carbon atoms may be any of linear, branched, cyclic. As the alkyl group, examples include, but are not limited to, a methyl group, an ethyl group, an n-propyl group, an isopropyl group, an n-butyl group, a cyclopentyl group, a cyclohexyl group, a bornyl group, an isobornyl group, a dicyclopentanyl group, an adamantyl group and a lower alkyl group substituted adamantyl group.

The alkenyl group having 2 to 18 carbon atoms may be any of linear, branched, cyclic. As such an alkenyl group, examples include, but are not limited to, a vinyl group, an allyl group and a propenyl group. The position of the double bond of the alkenyl group is not particularly limited. From the viewpoint of the reactivity of the obtained polymer, the alkenyl group preferably contains the double bond at the terminal.

As the aryl group, examples include, but are not limited to, a phenyl group, a biphenyl group, a naphthyl group, a tolyl group and a xylyl group. The aryl group may further contain a substituent. The aryl group preferably has 6 to 24 carbon atoms, and more preferably 6 to 12 carbon atoms.

As the aralkyl group, examples include, but are not limited to, a benzyl group, a phenethyl group, a naphthylmethyl group and a biphenylmethyl group. The aralkyl group may further contain a substituent. The aralkyl group preferably has 7 to 20 carbon atoms, and more preferably 7 to 14 carbon atoms.

The alkyl group and the alkenyl group may contain a substituent. As the substituent, examples include, but are not limited to, a halogen atom such as F, Cl, Br, and a nitro group.

As the substituent of the aromatic ring such as the aryl group and the aralkyl group, examples include, but are not limited to, a linear, branched alkyl group having 1 to 4 carbon atoms, an alkenyl group, a nitro group and a halogen atom.

The preferred carbon atom number does not include the number of the carbon atoms of the substituent.

For $R^{32}$, x1, y1 and z1 are the same as the above-described x, y and z, respectively.

As the hydrocarbon group as $R^{35}$ to $R^{42}$, examples include those exemplified above as the hydrocarbon group as $R^{32}$.

The hydrocarbon group containing one or more selected from an ether bond and an ester bond as $R^{37}$, $R^{38}$, $R^{39}$, $R^{40}$, $R^{41}$ and $R^{42}$ is a group represented by —R'—O—R", —R'—(C=O)—O—R" or —R'—O—(C=O)—R" (where R' and R" are each a hydrocarbon group or such a group that a hydrocarbon group is bound by at least one of an ether bond and an ester bond). In one group, two or more ether bonds and ester bonds may be present. When the hydrocarbon group is monovalent, as the hydrocarbon group, examples include an alkyl group, an alkenyl group, an aralkyl group and an aryl group. When the hydrocarbon group is divalent, as the hydrocarbon group, examples include an alkylene group, an alkenylene group, an arylene group and combinations thereof.

When $R^{37}$ and $R^{39}$ are bound to form a ring structure, the number of carbon atoms forming the ring structure is preferably from 5 to 8, and more preferably 6 (that is, 6-membered). The formed ring structure is preferably a cyclohexane ring.

As the hydrocarbon group or the hydrocarbon group containing one or more selected from an ether bond and an ester bond as the substituent $R^{44}$, examples include those exemplified above as the hydrocarbon groups as $R^{37}$, $R^{38}$, $R^{39}$, $R^{40}$, $R^{41}$ and $R^{42}$.

From the viewpoint of excellent dispersibility and dispersion stability of dispersed particles, $R^{32}$ is preferably a hydroxyl group, a hydrocarbon group, a monovalent group represented by —[CH($R^{33}$)—CH($R^{34}$)—O]$_{x1}$—$R^{35}$, —[(CH$_2$)$_{y1}$—O]$_{z1}$—$R^{35}$ or —O—$R^{36}$, more preferably a hydroxyl group, a methyl group, an ethyl group, a vinyl group, an aryl or aralkyl group optionally containing a substituent, a vinyl group, an allyl group, a monovalent group represented by —[CH($R^{33}$)—CH($R^{34}$)—O]$_{x1}$—$R^{35}$, —[(CH$_2$)$_{y1}$—O]$_{z1}$—$R^{35}$ or —O—$R^{36}$ (where $R^{33}$ and $R^{34}$ are each independently a hydrogen atom or a methyl group, and $R^{35}$ is —CO—CH=CH$_2$ or —CO—C(CH$_3$)=CH$_2$).

$R^{32}$ is still more preferably an aryl group optionally containing a substituent, a vinyl group, a methyl group and a hydroxyl group.

From the viewpoint of increasing alkali resistance, $R^{32}$ is preferably a hydrocarbon group, a monovalent group represented by —[CH($R^{33}$)—CH($R^{34}$)—O]$_{x1}$—$R^{35}$ or —[(CH$_2$)$_{y1}$—O]$_{z1}$—$R^{35}$. When having the structure that a carbon atom is directly bound to a phosphorus atom, due to hydrolysis resistance, it is estimated that a resin layer with excellent alkali resistance can be produced. From the viewpoint of excellent alkali resistance and excellent dispersibility and dispersion stability of dispersed particles, $R^{32}$ is preferably a methyl group, an ethyl group, an aryl or aralkyl group optionally containing a substituent, a vinyl group, an allyl group, a monovalent group represented by —[CH($R^{33}$)—CH($R^{34}$)—O]$_{x1}$—$R^{35}$ or —[(CH$_2$)$_{y1}$—O]$_{z1}$—$R^{35}$ (where $R^{33}$ and $R^{34}$ are each independently a hydrogen atom or a methyl group, and $R^{35}$ is —CO—CH=CH$_2$ or —CO—C(CH$_3$)=CH$_2$). From the viewpoint of dispersibility, $R^{32}$ is more preferably an aryl group optionally containing a substituent.

Also, $X^+$ of the general formula (I') represents an organic cation. The organic cation refers to a cation that the cation moiety contains a carbon atom. As the organic cation, examples include, but are not limited to, an ammonium cation such as an imidazolium cation, a pyridinium cation, an amidinium cation, a piperidinium cation, a pyrrolidinium cation, a tetraalkylammonium cation and a trialkylammonium cation, a sulfonium cation such as a trialkylsulfonium cation, and a phosphonium cation such as a tetraalkylphosphonium cation. From the viewpoint of dispersibility and alkaline developability, the organic cation is preferably a protonated, nitrogen-containing organic cation.

The organic cation preferably has an ethylenically unsaturated double bond, since curability can be provided.

From the point of view that excellent color material dispersibility and storage stability can be obtained and the film excellent in heat resistance and solvent resistance can be formed, the polymer containing one or more selected from the constitutional unit represented by the general formula (I) and the constitutional unit represented by the general formula (I'), as the (B) dispersant, is preferably such a polymer that is a reaction product of an acidic phosphorus compound and a polymer containing at least one of an epoxy group and a cyclic ether group in the side chain, and at least part of the acidic phosphorus compound groups may form a salt.

From the viewpoint of dispersibility, the polymer containing one or more selected from the constitutional unit represented by the general formula (I) and the constitutional unit represented by the general formula (I'), preferably further has a solvent-affinity moiety. From the point of view that excellent color material dispersibility and storage stability can be obtained and the film excellent in heat resistance and solvent resistance can be formed, such a dispersant is preferably a graft copolymer containing one or more selected from the constitutional unit represented by the general formula (I) and the constitutional unit represented by the general formula (I') and a constitutional unit represented by the following general formula (II), or a block copolymer containing the constitutional unit represented by the general formula (I) and the constitutional unit represented by the general formula (I') and a constitutional unit represented by the following general formula (III):

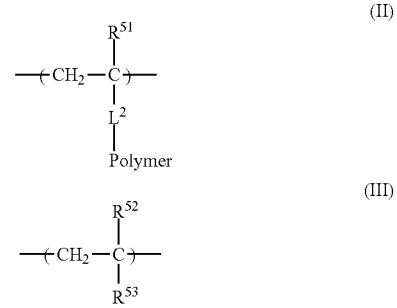

in the general formula (II), $L^2$ represents a direct bond or a divalent linking group; $R^{51}$ represents a hydrogen atom or a methyl group; and Polymer represents a polymer chain containing a constitutional unit represented by the following general formula (IV);

in the general formula (III), $R^{52}$ is a hydrogen atom or a methyl group; $R^{53}$ is a hydrocarbon group, a monovalent group represented by —[CH($R^{54}$)—CH($R^{55}$)—O]$_{x2}$—$R^{56}$, —[(CH$_2$)$_{y2}$—O]$_{z2}$—$R^{56}$, —[CO—(CH$_2$)$_{y2}$—O]$_{z2}$—$R^{56}$, —CO—O—$R^{56'}$ or —O—CO—$R^{56''}$; $R^{54}$ and $R^{55}$ are each independently a hydrogen atom or a methyl group; $R^{56}$ is a hydrogen atom, a hydrocarbon group, a monovalent group represented by —CHO, —CH$_2$CHO or —CH$_2$COOR$^{57}$; $R^{56'}$ is a hydrocarbon group, a monovalent group represented by —[CH($R^{54}$)—CH($R^{55}$)—O]$_{x2'}$—$R^{56}$, —[(CH$_2$)$_{y2'}$—O]$_{z2'}$—$R^{56}$, —[CO—(CH$_2$)$_{y2'}$—O]$_{z2'}$—$R^{56}$; $R^{56''}$ is an alkyl group having 1 to 18 carbon atoms; $R^{57}$ is a hydrogen atom or an alkyl group having 1 to 5 carbon atoms; the hydrocarbon group may contain a substituent; x2 and x2' are each an integer of from 1 to 18; y2 and y2' are each an integer of from 1 to 5; and z2 and z2' are each an integer of from 1 to 18;

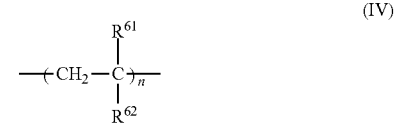

in the general formula (IV), $R^{61}$ is a hydrogen atom or a methyl group; $R^{62}$ is a hydrocarbon group, a monovalent group represented by —[CH($R^{63}$)—CH($R^{64}$)—O]$_{x3}$—$R^{65}$, —[(CH$_2$)$_{y3}$—O]$_{z3}$—$R^{65}$, —[CO—(CH$_2$)$_{y3}$—O]$_{z3}$—$R^{65}$, —CO—O—$R^{66}$ or —O—CO—$R^{67}$; $R^{63}$ and $R^{64}$ are each independently a hydrogen atom or a methyl group; $R^{65}$ is a hydrogen atom, a hydrocarbon group, a monovalent group represented by —CHO, —CH$_2$CHO or —CH$_2$COOR$^{68}$; $R^{66}$ is a hydrocarbon group, a monovalent group represented by —[CH($R^{63}$)—CH($R^{64}$)—O]$_{x4}$—$R^{65}$, —[(CH$_2$)$_{y4}$—O]$_{z4}$—$R^{65}$, —[CO—(CH$_2$)$_{y4}$—O]$_{z4}$—$R^{65}$; $R^{67}$ is an alkyl group having 1 to 18 carbon atoms; $R^{68}$ is a hydrogen atom or an alkyl group having 1 to 5 carbon atoms; the hydrocarbon group may contain a substituent;

n represents an integer of from 5 to 200; x3 and x4 are each an integer of from 1 to 18; y3 and y4 are each an integer of from 1 to 5; and z3 and z4 are each an integer of from 1 to 18.

Preferred examples of the graft copolymer containing one or more selected from the constitutional unit represented by the general formula (I) and the constitutional unit represented by the general formula (I') and the constitutional unit represented by the general formula (II) or the block copolymer containing one or more selected from the constitutional unit represented by the general formula (I) and the constitutional unit represented by the general formula (I') and the constitutional unit represented by the general formula (III), include graft and block copolymers described in JP-A No. 2017-002191, etc.

In the disclosed embodiments, as the dispersant, one kind of dispersant may be used solely, or a combination of two or more kinds of dispersants may be used. The content of the dispersant is appropriately determined depending on the type of the color material used, etc. In the color material dispersion liquid of the disclosed embodiments, with respect to 100 parts by mass of the color material, the dispersant is generally in a range of from 5 parts by mass to 200 parts by mass, preferably in a range of from 10 parts by mass to 100 parts by mass, and more preferably in a range of from 20 parts by mass to 80 parts by mass. When the content is in the range, the color material can be uniformly dispersed. Also, the ratio of the binder component contained in the composition described below, is not relatively low, the film with sufficient hardness can be formed.

In the color material dispersion liquid of the disclosed embodiments, with respect to the total amount of the dispersion liquid, the content of the dispersant is generally in a range of from 1% by mass to 50% by mass, and preferably from 1% by mass to 20% by mass, from the viewpoint of dispersibility and dispersion stability.

(Solvent)

In the color material dispersion liquid of the disclosed embodiments, the color material is used in the state of particles (aggregates) by dispersing the color material in the solvent. Since the color material is the above-specified salt-forming compound of the organic dye with the heteropolyoxometalate, it is hardly soluble in organic solvents. The color material being the salt-forming compound used in the disclosed embodiments is used by dispersing the color material in the solvent while keeping its aggregation state, thereby obtaining excellent light resistance. The solvent used in the disclosed embodiments is preferably a solvent in which the color material being the salt-forming compound is substantially insoluble or is hardly soluble and which has a solubility of 0.1 (mg/10 g solvent) or less at 23° C. The solvent is preferably a solvent in which the color material has a solubility of 0.01 (mg/10 g solvent) or less at 23° C., and more preferably a solvent in which the color material is substantially insoluble.

In the disclosed embodiments, the solvent in which the color material being the salt-forming compound has a solubility of 0.1 (mg/10 g solvent) or less at 23° C., can be simply determined by the following evaluation method.

First, 10 g the solvent, which is an object of evaluation, is put in a 20 mL sample tube bottle. In addition, 0.1 g of the color material is put in the sample tube bottle. The bottle is capped and shaken well for 20 seconds. Then, the bottle is left to stand for 10 minutes in a water bath at 23° C. Next, 5 g of the resulting supernatant is filtered for the removal of insoluble matters. The filtered supernatant is diluted 1000 times to obtain a solution, and the absorption spectrum of the solution is measured by using a 1 cm cell in a UV-VIS-NIR spectrophotometer (e.g., UV-3100PC manufactured by Shimadzu Corporation) to obtain an absorbance at the maximum absorption wavelength. When the absorbance at the maximum absorption wavelength is less than 2, the solvent can be evaluated as a solvent in which the color material has a solubility of 0.1 (mg/10 g solvent) or less at 23° C. (i.e., a hardly-soluble solvent).

In the above-described evaluation method, the absorption spectrum is measured in the same manner as above, without diluting the obtained supernatant, and the absorbance at the maximum absorbance wavelength is obtained. When the absorbance at the maximum absorption wavelength is less than 2, the solvent can be evaluated as a solvent in which the color material being the salt-forming compound, is substantially insoluble.

The solvent in which the color material has a solubility of 0.1 (mg/10 g solvent) or less at 23° C., is not particularly limited, as long as it is a solvent in which the color material being the salt-forming compound, is substantially insoluble, or as long as it is a hardly-soluble solvent. The solvent can be appropriately selected from solvents which are unreactive to the components of the color material dispersion liquid and in which the components are soluble or dispersible.

In the color material dispersion liquid of the disclosed embodiments, from the viewpoint of dispersion stability, an ester solvent is preferably used.

As the ester solvent, examples include, but are not limited to, ethyl acetate, butyl acetate, methyl methoxypropionate, ethyl ethoxypropionate, ethyl lactate, methoxyethyl acetate, propylene glycol monomethyl ether acetate, 3-methoxy-3-methyl-1-butyl acetate, 3-methoxybutyl acetate, methoxy butyl acetate, ethoxy ethyl acetate and ethyl cellosolve acetate.

These solvents may be used solely or in combination of two or more kinds.

The color material dispersion liquid of the disclosed embodiments is prepared by using the above-described solvent in an amount of generally from 50% by mass to 95% by mass, preferably from 60% by mass to 85% by mass, with respect to the total amount of the color material dispersion liquid containing the solvent. When the solvent amount is too small, the viscosity increases, and the dispersibility is likely to decrease. When the solvent amount is too large, the color material concentration decreases and, depending on the intended application, there is a possibility that the effect of absorbing light of the specific wavelength is not insufficient.

(Other Components)

As needed, the color material dispersion liquid of the disclosed embodiments may further contain other color material, a dispersion assisting resin and other components.

Other color material is added as needed, for the purpose of color tone control. It can be selected from conventionally-known color materials such as pigments and dyes, according to the purpose, and such color materials can be used alone or in combination of two or more kinds. The content of the other color material is not particularly limited, as long as the effect of the disclosed embodiments are not impaired. It may be the same as the case where it is used in the composition described below.

As the dispersion assisting resin, examples include, but are not limited to, an alkali soluble resin. The particles of the color material become less likely to contact with each other due to steric hindrance by the alkali soluble resin, resulting in stabilization of particle dispersion, and the particle dispersion stabilization effect may be effective in reducing the dispersant.

As the other components, examples include, but are not limited to, a surfactant, which is used to increase wettability, a silane coupling agent, which is used to increase adhesion properties, a defoaming agent, a cissing inhibitor, an antioxidant, an aggregation inhibitor and an ultraviolet absorber.

<Method for Producing the Color Material Dispersion Liquid>

The color material dispersion liquid of the disclosed embodiments can be prepared by the following method: the dispersant is mixed with the solvent and stirred to produce a dispersant solution; the dispersant solution is mixed with the color material of the disclosed embodiments and, as needed, other compound; and the mixture is dispersed with a disperser, thereby preparing the color material dispersion liquid. Also, the color material dispersion liquid of the disclosed embodiments may be prepared by mixing the color material and the dispersant with the solvent, and dispersing the mixture by use of a known disperser.

As the disperser used for the dispersion treatment, examples include, but are not limited to, a roller mill such as a two-roller mill and a three-roller mill; a ball mill such as a vibrating ball mill; a paint conditioner; and a bead mill such as a continuous disk type bead mill and a continuous annular type bead mill. In the case of using a bead mill, a preferred dispersion condition is such that the diameter of the beads used is preferably from 0.03 mm to 2.00 mm, and more preferably from 0.10 mm to 1.0 mm.

In particular, a preparatory dispersion is carried out with 2 mm zirconia beads, which is a relatively large bead diameter, and then a main dispersion is further carried out with 0.1 mm zirconia beads, which is a relatively small bead diameter. It is preferable to carry out filtration with a 0.1 to 0.5 μm membrane filter after the dispersion treatment.

In the disclosed embodiments, the dispersion time for dispersion using a known dispersing device, is appropriately controlled and is not particularly limited. For example, the dispersion time is preferably from 5 hours 40 hours, from the viewpoint of forming the color material into fine particles and achieving high absorption properties with respect to the light in the unnecessary wavelength range.

The color material dispersion liquid excellent in the dispersibility of the color material particles, is obtained in this manner.

In the color material dispersion liquid, the average dispersed particle diameter of the color material used in the disclosed embodiments, may be appropriately determined depending on the intended application and is not particularly limited. From the viewpoint of obtaining excellent light resistance, the average dispersed particle diameter is preferably in a range of from 10 nm to 150 nm, and more preferably in a range of from 20 nm to 125 nm. By setting the average dispersed particle diameter of the color material within the range, a surface coated with the color material dispersion liquid of the disclosed embodiments exhibits uniform and excellent absorption performance with respect to the light in the unnecessary wavelength range.

The average dispersed particle diameter of the color material in the color material dispersion liquid is the dispersed particle diameter of the color material particles dispersed in a dispersion medium that contains at least a solvent, and it is measured with a laser scattering particle size distribution analyzer. The average dispersed particle diameter can be measured as follows with a laser scattering particle size distribution analyzer: the color material dispersion liquid is appropriately diluted with the solvent used for the color material dispersion liquid to a concentration that is measurable with a laser scattering particle size distribution analyzer (e.g., 1,000-fold) and then measured with a laser scattering particle size distribution analyzer (e.g., NANO-TRAC PARTICLE SIZE ANALYZER UPA-EX150 manufactured by Nikkiso Co., Ltd.) by a dynamic light scattering method at 23° C. This average dispersed particle diameter is a volume average particle diameter.

The color material dispersion liquid can be used as a preliminarily prepared product for preparing the below-described composition. That is, the color material dispersion liquid is such a color material dispersion liquid, that it is preliminarily prepared at a stage prior to preparing the below-described composition and the ratio of "the mass of the color material in the composition"/"the mass of the solid content other than the color material in the composition" is high. In particular, this ratio ("the mass of the color material in the composition"/"the mass of the solid content other than the color material in the composition" ratio) is generally 1.0 or more. By mixing the color material dispersion liquid with at least a binder component, a composition with excellent dispersibility can be prepared.

B. Composition

The composition of the disclosed embodiments contains a color material, which is a salt-forming compound of an organic dye with a heteropolyoxometalate, and a binder component, wherein the organic dye is at least one organic dye selected from the group consisting of a porphyrin dye, a tetraazaporphyrin dye, a phthalocyanine dye and a squarylium dye, and wherein the heteropolyoxometalate is a heteropolyoxometalate which has an oxidation-reduction potential larger than −0.3 V relative to the silver/silver chloride electrode.

In the composition of the disclosed embodiments, by using the color material which is the salt-forming compound of the predetermined organic dye with the heteropolyoxometalate having an oxidation-reduction potential larger than −0.3 V relative to the silver/silver chloride electrode (hereinafter, the color material may be referred to as the specific color material used in the disclosed embodiments) in combination with the binder component, a film with excellent light resistance can be formed while selectively and effectively reducing the light in the unnecessary wavelength range.

The composition of the disclosed embodiments contains at least the specific color material used in the disclosed embodiments and the binder component. As needed, the composition may further contain other components.

Also in the composition of the disclosed embodiments, the color material dispersion liquid may be used in combination with the binder component. In this case, the composition of the disclosed embodiments contains the specific color material used in the disclosed embodiments, the binder component, the dispersant and the solvent.

Hereinafter, the components of the composition of the disclosed embodiments will be described in detail. As the components that can be contained in the color material dispersion liquid of the disclosed embodiments, those described above in "A. Color material dispersion liquid" may be used. Accordingly, the components will not be described here. However, the solvent is not limited to the above-described preferred solvent, and a solvent in which the solubility of the binder component and other components added as needed is high, may be appropriately selected and used as the solvent.

(Binder Component)

To provide film-forming properties and surface adhesion properties, the composition of the disclosed embodiments contains a binder component.

The binder component preferably contains at least a resin. The resin may be any of a pressure-sensitive adhesive, a thermoplastic resin, a thermosetting resin or a photocurable resin. The resin is not limited to a high-molecular-weight compound or a polymer, and the resin may be a low-molecular-weight compound or a monomer.

The binder component preferably has optical transparency. When only the binder component is used to form a film having the same film thickness of the film of the disclosed embodiments, the transmittance in the visible light range is preferably 80% or more, and more preferably 84% or more. The transmittance can be measured by JIS K7361-1 (Determination of the total luminous transmittance of plastics-transparent materials).

As the pressure-sensitive adhesive, examples include, but are not limited to, an acrylic pressure-sensitive adhesive, a silicone pressure-sensitive adhesive, a urethane pressure-sensitive adhesive, a polyvinyl butyral pressure-sensitive adhesive, an ethylene-vinyl acetate pressure-sensitive adhesive, polyvinyl ether, saturated amorphous polyester and melamine resin.

As the thermoplastic resin, for example, the following are preferred: epoxy resin; acrylic resin such as polymethyl methacrylate and polyacrylic acid amide; polystyrene resin; cellulose resin such as nitrocellulose and ethylcellulose; polyester resin; thermoplastic urethane resin; modified olefin resin such as chlorinated polyethylene and chlorinated polypropylene; vinyl resin such as vinyl acetate resin, vinyl chloride-vinyl acetate copolymer and butyral resin; and amorphous polyolefin having a norbornene structure. The glass transition temperature of the resin is preferably in a range of from 90° C. to 180° C., and particularly preferably in a range of from 120° C. to 180° C.

From the viewpoint of providing sufficient hardness to coating films, the composition preferably contains a curable binder component that contains a thermosetting resin or a photocurable resin. The curable binder component is not particularly limited, and a conventionally-known curable binder component can be appropriately used.

As the curable binder component, for example, one containing a photocurable binder component that contains a photocurable resin, which is polymerizable and curable by visible light, ultraviolet, electron beam radiation, etc., or one containing a thermosetting binder component that contains a thermosetting resin, which is polymerizable and curable by heating, can be used.

As the thermosetting binder, a combination of a curing agent and a compound containing two or more thermosetting functional groups per molecule, is generally used. In addition, a catalyst that can promote a thermosetting reaction can be added. As the thermosetting functional groups, examples include, but are not limited to, an epoxy group, an oxetanyl group, an isocyanate group and an ethylenically unsaturated bond. As the thermosetting functional groups, epoxy groups are preferably used. As the thermosetting binder component, examples include, but are not limited to, those mentioned in International Publication No. WO2012/144521.

As the photocurable binder, a combination of a photoinitiator and a compound containing one or more photocurable functional groups per molecule, is generally used. The compound and photoinitiator can be appropriately selected from conventionally-known compounds and photoinitiators and used. As the photocurable functional group, examples include, but are not limited to, radically polymerizable, ethylenically unsaturated bond-containing group, a cationically polymerizable epoxy group and an oxetanyl group. As the photocurable functional group, an ethylenically unsaturated bond-containing group is preferably used, such as a vinyl group and a (meth)acryloyl group.

From the viewpoint of increasing hardness, the photocurable compound preferably contains three or more photocurable functional groups per molecule.

As the radically polymerizable compound, from the viewpoint of high reactivity, a compound containing a (meth)acryloyl group is preferred. Also, a compound containing 2 to 6 (meth)acryloyl groups per molecule, which is referred to as polyfunctional (meth)acrylate monomer, and an oligomer containing several (meth)acryloyl groups per molecule and having several hundreds to several thousands of molecular weight, which is referred to as urethane (meth)acrylate, polyester (meth)acrylate, epoxy (meth)acrylate, are preferably used.

When the film has a pattern and a photolithography process is used in the formation of the film, a photosensitive binder component with alkaline developability is preferably used.

As the photosensitive binder component, examples include, but are not limited to, a positive photosensitive binder component and a negative photosensitive binder component. As the positive photosensitive binder component, examples include, but are not limited to, a system containing an alkali soluble resin and an o-quinonediazide group-containing compound, which is a photosensitivity-imparting component. As the alkali soluble resin, examples include, but are not limited to, a polyimide precursor.

As the negative photosensitive binder component, a system containing at least an alkali soluble resin, a polyfunctional monomer and a photoinitiator, is suitably used. As the alkali soluble resin, polyfunctional monomer and photoinitiator, examples include, but are not limited to, those described in International Publication No.

(Optionally Added Components)

As needed, the composition of the disclosed embodiments may contain other color material or various kinds of additives, to the extent that does not impair the object of the disclosed embodiments.

As the additives, examples include, but are not limited to, a polymerization inhibitor, a chain transfer agent, a leveling agent, a plasticizer, a surfactant, a defoaming agent, a silane coupling agent, an ultraviolet absorber, an adhesion enhancing agent, an antistatic agent and a filler.

As the surfactant and the plasticizer, examples include, but are not limited to, those mentioned in International Publication No. WO2012/144521.

(The Content of Each Component in the Composition)

The total content of the specific color material used in the disclosed embodiments and the other color material added as needed, is preferably from 0.1% by mass to 20% by mass, and more preferably from 0.2% by mass to 10% by mass, with respect to the total solid content of the composition. When the amount of the color material is too small, it may be difficult to obtain desired absorption properties with respect to the light in the unnecessary wavelength range. When the amounts of the color material, etc., is too large, the properties of a coating film formed by applying the composition to a substrate and curing the applied composition, such as adhesion to the substrate, surface roughening of the cured film and the hardness of the coating film, may be insufficient. In the disclosed embodiments, "solid content" refers to all of the above-described components other than the solvent, and it also includes a polyfunctional monomer that is in a liquid form at 25° C.

In the case of using the dispersant, the content of the dispersant may be appropriately controlled in a range where the color material can be homogeneously dispersed. For example, the dispersant content is preferably from 10 parts by mass to 150 parts by mass, with respect to 100 parts by mass of the color material. Also, the content is more preferably from 15 parts by mass to 45 parts by mass, and still more preferably from 15 parts by mass to 40 parts by mass, with respect to 100 parts by mass of the color material. With respect to the total solid content of the composition, the content of the dispersant is preferably in a range of from 0.01% by mass to 30% by mass, and particularly preferably in a range of from 0.03% by mass to 10% by mass. When the content of the dispersant is less than 0.01% by mass with respect to the total solid content of the composition, the effect produced by using the dispersant may be insufficient. When the content of the dispersant is more than 30% by mass, insufficient hardness and developability may be obtained.

For the amount of the binder component, the total content is preferably from 24% by mass to 94% by mass, more preferably from 40% by mass to 90% by mass, with respect to the total solid content of the composition.

In the case of using the solvent, the content can be appropriately controlled depending on the dispersibility of the color material, the coatability of the composition, etc. In general, with respect to the total amount of the composition containing the solvent, the solvent is preferably in a range of from 65% by mass to 95% by mass, and more preferably in a range of from 75% by mass to 88% by mass.

(Production of Composition)

The method for producing the composition is not particularly limited.

In the case of using a pressure-sensitive adhesive or thermoplastic resin as the binder component, the specific color material used in the disclosed embodiments, may be added to the pressure-sensitive adhesive or thermoplastic resin, and they are mixed or kneaded together and used.

Also, there is the following method: the binder component and various kinds of additional components used as needed, are added to the solvent; they are mixed together; the color material used in the disclosed embodiments is added to the mixture; and they are mixed together.

In the case of preparing the composition using the color material dispersion liquid of the disclosed embodiments, there may be mentioned the following methods, for example: a method of adding the color material dispersion liquid of the disclosed embodiments, the binder component and various kinds of additional components used as needed to the solvent at the same time and mixing them, and a method of adding the binder component and various kinds of additional components used as needed to the solvent, mixing them, adding the color material dispersion liquid of the disclosed embodiments thereto and then mixing them.

C. Film

The film of the disclosed embodiments is a film comprising the composition of the disclosed embodiments or a cured product thereof.

The film of the disclosed embodiments may have a pattern, or it may be a film having no pattern (i.e., a flat film). Also, the film of the disclosed embodiments may be used in the state of being laminated on a support, or the film of the disclosed embodiments may be removed from the substrate and used.

The film thickness of the film of the disclosed embodiments may be appropriately controlled depending on the purpose. The film thickness is preferably 50 µm or less, more preferably 25 µm or less, and still more preferably 10 µm or less. The lower limit of the film thickness is preferably 0.1 µm or more, more preferably 0.2 µm or more, and still more preferably 0.3 µm or more.

Since the film of the disclosed embodiments contains the specific color material used in the present invention, the film has high light resistance, and the film is less likely to cause a change in spectral characteristics, which is attributed to the deterioration of the color material, even after a long-term use. In particular, before and after the following light resistance test is carried out, the retention rate of the transmittance value of the maximum absorption wavelength of the dye, that is the minimum transmission wavelength of the transmission spectrum, is preferably 70% or more, and more preferably 80% or more.

Also, before and after the following light resistance test is carried out, the thus-obtained color difference (ΔEab) is preferably 25 or less, and more preferably 20 or less.

(Light Resistance Test)

A film in which the concentration of the specific color material used in the disclosed embodiments is 8% by mass and which have a film thickness of 3 µm, is produced. Under the atmospheric pressure, the film is irradiated with a xenon lamp (SUNTEST XLS+ (a 1.7 kW air-cooled xenon lamp) manufactured by ATLAS) at a wavelength of from 300 nm to 400 nm and an irradiance of 58 W/m² for 60 hours (equivalent to 11000 kJ/m²). The retention rate of the transmittance value of the minimum transmission wavelength of the transmission spectrum before and after the irradiation, is calculated by the following formula (1). The color difference (ΔEab) before and after the irradiation is calculated by the following formula (2). The color coordinates L, a, b of the film before being subjected to the irradiation, are determined as ($L_1$, $a_1$, $b_1$), and the color coordinates L, a, b of the film after the irradiation are determined as ($L_2$, $a_2$, $b_2$).

The retention rate=(100−The transmittance (%) of the minimum transmission wavelength after the test)/(100−The transmittance (%) of the minimum transmission wavelength before the test)× 100    Formula (1):

$$\Delta Eab = \{(L_2-L_1)^2 + (a_2-a_1)^2 + (b_2-b_1)^2\}^{1/2}$$    Formula (2):

As the method for producing the film of the disclosed embodiments, for example, there may be mentioned a method comprising the step of forming a composition layer on a support by use of the composition of the disclosed embodiments and, as needed, the step of curing the composition layer.

The support is not particularly limited. The support may be a support composed of a material such as glass, silicon, polycarbonate, polyester, polyacrylic, aromatic polyamide, polyamideimide, polyimide, cycloolefin polymer and cellulose acylate, or it may be a different optical member used in display devices.

The method for applying the composition to the support may be appropriately selected from known methods and used. As the known methods, examples include, but are not limited to, composition applying methods such as a gravure coating method, a reverse coating method, a knife coating method, a dip coating method, a spray coating method, an air knife coating method, a spin coating method, a roll coating method, a printing method, a dipping method, a curtain coating method, a die coating method, a casting method, a bar coating method, an extrusion coating method and an E-type applying method; various kinds of printing methods such as an ejection type printing method (e.g., inkjet printing and nozzle-jet printing), a flexographic printing method, a screen printing method, a gravure printing method, a reverse offset printing method and a metal mask printing method; transfer methods using a mold or the like; and nanoimprint methods.

As needed, the solvent is appropriately removed (dried) from the composition layer applied on the support, thereby forming the film.

As the composition layer curing step, a known method may be appropriately selected depending on the curability of the binder component contained in the composition, such as at least one of heating and light irradiation, and the binder component may be cured by the selected method.

When the film of the disclosed embodiments has a pattern, as the method for forming the film, there may be mentioned a method comprising the step of forming the pattern by on the composition layer by a photolithography method or a dry etching method.

The photolithography method or the dry etching method is not particularly limited, and it may be appropriately selected from known methods, depending on the binder component contained in the composition.

As another method for forming the film of the disclosed embodiments, for example, there may be mentioned a method of shaping the film by use of the composition of the disclosed embodiments. The shaping method may be appropriately selected from known methods, depending on the binder component contained in the composition.

The film of the disclosed embodiments is applicable to an image display device and various kinds of devices including solid-state image sensing devices such as a charge-coupled device (CCD) and a complementary metal-oxide semiconductor (CMOS). Also, the film of the disclosed embodiments is applicable to, for example, an optical filter or lens having a function of absorbing or cutting a selective wavelength, a color correction filter for color tone control, and a recording medium using the absorption heat of a selective wavelength.

D. Optical Filter

The optical filter of the disclosed embodiments is an optical filter comprising a color material, which is a salt-forming compound of an organic dye with a heteropolyoxometalate, wherein the organic dye is at least one organic dye selected from the group consisting of a porphyrin dye, a tetraazaporphyrin dye, a phthalocyanine dye and a squarylium dye, and wherein the heteropolyoxometalate is a heteropolyoxometalate which has an oxidation-reduction potential larger than −0.3 V relative to the silver/silver chloride electrode.

Since the optical filter of the disclosed embodiments contains the above-specified color material which is the salt-forming compound of the organic dye with the heteropolyoxometalate, the optical filter has excellent light resistance. Also, by appropriately selecting the specific organic dye, the optical filter can selectively absorb light in a desired wavelength range, can selectively and effectively reduce the light in the unnecessary wavelength range, and can exert a color correction function for color tone control.

The optical filter of the disclosed embodiments preferably includes a film comprising the composition of the disclosed embodiments or a cured product thereof, the composition comprising the above-specified color material which is the salt-forming compound of the organic dye with the heteropolyoxometalate.

For the optical filter of the disclosed embodiments, a support, a pressure-sensitive adhesive layer and a removable release film may be laminated on the film comprising the composition of the disclosed embodiments or the cured product thereof. The support, the pressure-sensitive adhesive layer and the removable release film may be appropriately selected from conventionally-known structures. As the pressure-sensitive adhesive layer and the removable release film, example include, but are not limited to, those described in JP-A No. 2009-251511.

The optical filter of the disclosed embodiments may further comprise different functional layers.

As the different functional layers, examples include, but are not limited to, a polarizer, a protective film, an anti-reflection layer, an anti-glare layer, an anti-fouling layer, an anti-static layer, a hard coat layer, a pressure-sensitive adhesive layer and an adhesion layer.

The optical filter of the disclosed embodiments may be such an optical filter, that the conventionally-known optical filter component contains the above-specified color material which is the salt-forming compound of the organic dye with the heteropolyoxometalate. For example, there may be mentioned such an optical filter that at least one of the functional layers contains the above-specified color material which is the salt-forming compound of the organic dye with the heteropolyoxometalate.

E. Display Device

The display device of the first embodiment is a display device comprising the optical filter of the disclosed embodiments.

The optical filter may be incorporated into the display device and used. The method for incorporating the optical filter is not particularly limited. The display device is not particularly limited in use or application.

As the display element constituting the display device, examples include, but are not limited to, a liquid crystal display element, an EL (inorganic EL, organic EL) display element, a plasma display element, an electronic paper display element, an LED display element (such as micro LED) and a display element using a quantum dot light emitting diode (QLED). That is, as the display device, examples include, but are not limited to, a liquid crystal display device, an EL (inorganic EL, organic EL) display device, a plasma display device, an electronic paper display device, an LED display device (such as micro LED) and a display device using a quantum dot light emitting diode (QLED).

In the case of the liquid crystal display device, a backlight is needed to be disposed on the opposite side to the molded body of the display element.

An example of the display device of the disclosed embodiments will be described by use of a figure.

As shown in FIG. 1, an image display device 100 mainly comprises a display panel 10 for displaying an image, a backlight device 20 disposed on the back side of the display panel 10, a touch panel 30 disposed on the side closer to an observer than the touch panel 10, and a light transmissive adhesion layer 70 disposed between the display panel 10 and the touch panel 30. In the disclosed embodiments, since the display panel 10 is a liquid crystal display panel, the image display device 100 comprises the backlight device 20. Depending on the type of the display panel (display element), the backlight device 20 is not needed.

(Display Panel)

As shown in FIG. 1, the display panel 10 has the structure that a protective film 11 (such as a triacetyl cellulose (TAC) film and a cycloolefin polymer film), a polarizer 12, a protective film 13, a light transmissive pressure-sensitive adhesive layer 14, a display element 15, a light transmissive pressure-sensitive adhesive layer 16, a protective film 17, a polarizer 18, a protective film 19 are laminated in this sequence from the backlight device 20 side to the observer side. The display panel 10 includes the display element 15, and the protective film 11 and so on are not always included in the display panel 10.

The display element 15 shown in FIG. 1 is a liquid crystal display element. However, the display element 15 is not limited to a liquid crystal display element and may be the above-described display element, for example. The liquid crystal display element is such a display element that a liquid crystal layer, an alignment film, an electrode layer, a color filter, etc., are disposed between two glass substrates.

(Backlight Device)

The backlight device 20 functions to light the display panel 10 from the back side of the display panel 10. As the backlight device 20, a known backlight device may be used, or the backlight device 20 may be any of an edge light type backlight device and a direct type backlight device. As the light source of the backlight device, examples include, but are not limited to, LED and CCFL. The backlight device which uses quantum dots as the light source, easily enhances color reproducibility.

(Touch Panel)

The touch panel 30 comprises an electroconductive film 40, an electroconductive film 50 disposed on the side closer to the observer than the electroconductive film 40, a light transmissive cover member 61 (such as a cover glass and a resin surface material) disposed on the side closer to the observer than the electroconductive film 50, a light transmissive pressure-sensitive adhesive layer 62 disposed between the electroconductive film 40 and the electroconductive film 50, and a light transmissive pressure-sensitive adhesive layer 63 disposed between the electroconductive film 50 and the light transmissive cover member 61.

The electroconductive film 40 has almost the same structure as the electroconductive film 50. That is, as shown in FIG. 1, the electroconductive film 40 comprises a light transmissive substrate 41, a light transmissive functional layer 42 disposed on one surface of the light transmissive substrate 41, and electroconductive sections 44 disposed on the opposite side to the light transmissive substrate 41 side of the light transmissive functional layer 42 and subjected to patterning. The electroconductive sections 44 are part of an electroconductive layer 43. The electroconductive layer 43 is composed of the electroconductive sections 44 and non-electroconductive sections 45 disposed between the electroconductive sections 44. In the same manner as electroconductive film 40, as shown in FIG. 1, the electroconductive film 50 comprises a light transmissive substrate 51, a light transmissive functional layer 52 disposed on one surface of the light transmissive substrate 51, and electroconductive sections 54 disposed on the opposite side to the light transmissive substrate 51 side of the light transmissive functional layer 52 and subjected to patterning. The electroconductive sections 54 are part of an electroconductive layer 53. The electroconductive layer 53 is composed of the electroconductive sections 54 and non-electroconductive sections 55 disposed between the electroconductive sections 54.

The electroconductive sections are composed of a light transmissive resin and electroconductive fibers. The non-electroconductive sections are composed of a light transmissive resin and do not substantially contain electroconductive fibers. The non-electroconductive sections may have a hollow in the light transmissive resin. In each electroconductive section, the electroconductive fibers are unevenly distributed and are present from the half position of the thickness of each electroconductive section to the light transmissive substrate side of each electroconductive film, thereby making each electroconductive section electroconductive from the surface thereof.

The electroconductive sections 54 of the electroconductive film 50 function as the Y-direction electrode of a projected capacitive touch panel. The electroconductive sections 44 of the electroconductive film 40 function as the X-direction electrode of the projected capacitive touch panel. Each electroconductive section includes sensors and terminals (not shown) connected to the sensors. The electroconductive sections 44 have the same structure as the electroconductive sections 54; however, it is not always needed that the electroconductive sections 44 have the same structure as the electroconductive sections 54.

(Light Transmissive Pressure-Sensitive Adhesive Layer)

As the light transmissive pressure-sensitive adhesive layers 62, 63, examples include, but are not limited to, a pressure-sensitive adhesive sheet such as an optical clear adhesive (OCA). Light transmissive adhesion layers may be used in place of the light transmissive pressure-sensitive adhesive layers 62, 63.

(Light Transmissive Adhesion Layer)

The light transmissive adhesion layer 70 is present between the display panel 10 and the touch panel 30 and adheres to both the display panel 10 and the touch panel 30. Accordingly, the display panel 10 and the touch panel 30 are fixed. The light transmissive adhesion layer 70 is composed of a cured product of a liquid composition for curable adhesive layers, the composition containing a polymerizable compound such as an optically clear resin (OCR).

The thickness of the light transmissive adhesion layer 70 is preferably 10 μm or more and 150 μm or less. When the thickness of the light transmissive adhesion layer is less than 10 μm, since the thickness is too thin, problems such as entry of contaminants and insufficient step followability are likely to occur. When the thickness of the light transmissive adhesion layer is more than 150 μm, the production cost is too high. The thickness of the light transmissive adhesion layer is obtained by taking a photograph of a section of the light transmissive adhesion layer with an optical microscope, randomly measuring the thicknesses of 10 points on the photograph, and obtaining the arithmetic mean value of the thicknesses of the measured 10 points as the thickness of the light transmissive adhesion layer. A light transmissive pressure-sensitive adhesive layer may be used in place of the light transmissive adhesion layer 70.

For the image display device 100, which is the example shown in FIG. 1, the description in paragraphs 0018 to 0121 and FIGS. 1 to 13 of JP-A No. 2018-060607 can be taken into consideration, and they are incorporated in the DESCRIPTION.

In the image display device example shown in FIG. 1, the optical filter of the disclosed embodiments may be disposed at a suitable position to reduce the light in the unnecessary wavelength range. For example, it may be appropriately disposed on the side closer to the observer than the optical members which may be a cause for the light in the unnecessary wavelength range.

As the optical filter of the disclosed embodiments disposed in the display device of the disclosed embodiments, suitable examples include, but are not limited to, a light transmissive cover member 61, a light transmissive pressure-sensitive adhesive layer 62, a light transmissive pressure-sensitive adhesive layer 63 and a light transmissive adhesion layer 70.

Another example of the display device of the disclosed embodiments will be described by use of a figure.

Figure 2:
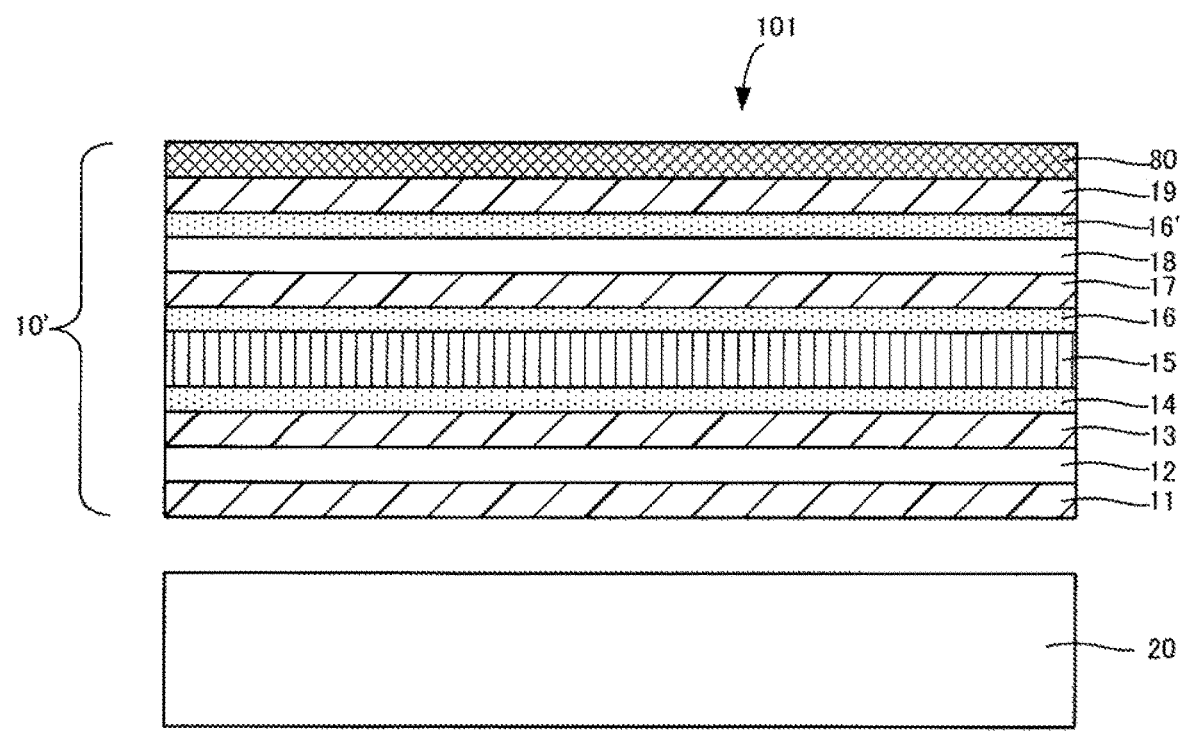
FIG. 2 is a schematic configuration diagram of another example of the display device of the disclosed embodiments.

As shown in FIG. 2, an image display device 101 mainly comprises a display panel 10' for displaying an image, and a backlight device 20 disposed on the back side of the display panel 10'. In the disclosed embodiments, since the display panel 10' is a liquid crystal display panel, the image display device 101 comprises the backlight device 20. Depending on the type of the display panel (display element), the backlight device 20 is not needed.

The backlight device 20 of FIG. 2 will not be described here, since it may be the same as the backlight device of FIG. 1.

(Display Panel)

As shown in FIG. 2, the display panel 10' has the structure that a protective film 11, a polarizer 12, a protective film 13, a light transmissive pressure-sensitive adhesive layer 14, a display element 15, a light transmissive pressure-sensitive adhesive layer 16, a protective film 17, a polarizer 18, a light transmissive pressure-sensitive adhesive layer 16', a protective film 19, a hard coat layer 80 are laminated in this sequence from the backlight device 20 side to the observer side. The display panel 10' includes the display element 15, and the protective film 11 and so on are not always included in the display panel 10'.

The display element 15 of FIG. 2 is a liquid crystal display element. However, the display element 15 is not limited to a liquid crystal display element and may be the display element as described above.

The protective films, polarizers, light transmissive pressure-sensitive adhesive layers and display element of FIG. 2 will not be described here since they may be the same as those of FIG. 1.

In general, the hard coat layer 80 of FIG. 2 is a layer which has higher hardness than protective films and which imparts at least abrasion resistance. The hard coat layer 80 preferably exhibits a hardness of H or more in a pencil hardness test (load 4.9 N) defined in JIS K5600-5-4(1999).

The hard coat layer 80 preferably has an anti-reflection function and an anti-glare function for increasing visibility, and it may further have an anti-fouling function and an anti-static function.

The hard coat layer 80 may be selected from hard coat layers which are used in the optical filters or optical films of conventionally-known display devices. For the hard coat layer, for example, hard coat layers described in International Publication Nos. WO2012/018087 and WO2011/065531, JP-A No. 2018-51918 and so on can be taken into consideration, and they are incorporated in the DESCRIPTION. However, the hard coat layer 80 is not limited to them.

Even in the image display device example shown in FIG. 2, the optical filter of the disclosed embodiments may be appropriately disposed on the side closer to the observer than the optical members which may be a cause for the light in the unnecessary wavelength range.

As the optical filter of the disclosed embodiments included in the display device of the disclosed embodiments, suitable examples include, but are not limited to, the light transmissive pressure-sensitive adhesive layer 16' and the hard coat layer 80.

The display device of the disclosed embodiments is not limited to the above-described examples, and conventionally-known structures may be appropriately selected and used. In the display device, the optical filter of the disclosed embodiments may be disposed at a suitable position to reduce the light in the unnecessary wavelength range, for example, and it may be appropriately selected.

EXAMPLES

Hereinafter, the disclosed embodiments will be described in detail by way of examples. The disclosed embodiments are not limited by the following descriptions.

Synthesis Example 1: Synthesis of Compound 1

First, 3.82 g (1.63 mmol) of 12-molybdosilicic acid n-hydrate (manufactured by Nippon Inorganic Colour & Chemical Co., Ltd.) was dissolved in 40 mL of methanol by heating. Next, 2.0 g (3.25 mmol) of tetraphenylporphyrin (manufactured by Tokyo Chemical Industry Co., Ltd.) was added thereto, and the mixture was stirred for one hour. The resulting precipitate was obtained by filtration and washed with water. The obtained precipitate was dried under reduced pressure, thereby obtaining 4.67 g of the following compound 1 (yield 94%).

The obtained compound was confirmed to be a target compound from the following analysis results:

MS (MALDI) (m/z): 615($MH^+$), 1822($MH_3^-$)

Elemental analysis values: CHN measurement values (34.65%, 2.09%, 3.66%); theoretical values (34.62%, 2.11%, 3.67%)

X-ray fluorescence analysis: V/W/Mo actual ratio (0%/0%/100%); theoretical values (0%/0%/100%)

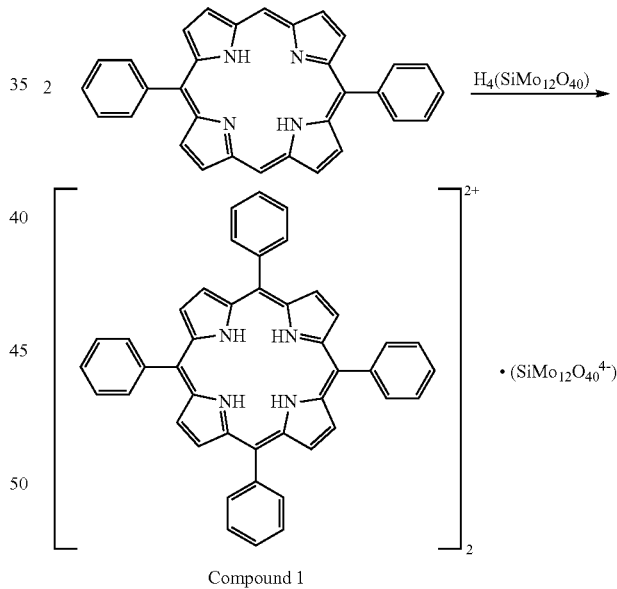

Compound 1

Synthesis Example 2: Synthesis of Compound 2

The following compound 2 was obtained (yield 96%) in the same manner as Synthesis Example 1, except that 5.09 g (2.17 mmol) of 12-molybdophosphoric acid n-hydrate (manufactured by Nippon Inorganic Colour & Chemical Co., Ltd.) was used in place of the 12-molybdosilicic acid n-hydrate (manufactured by Nippon Inorganic Colour & Chemical Co., Ltd.)

The obtained compound was confirmed to be a target compound from the following analysis results:

MS (MALDI) (m/z): 615(MH$^+$), 1824(MH$_2^-$)

Elemental analysis values: CHN measurement values (28.87%, 1.76%, 3.03%); theoretical values (28.85%, 1.76%, 3.06%)

X-ray fluorescence analysis: V/W/Mo actual ratio (0%/0%/100%); theoretical values (0%/0%/100%)

Compound 2

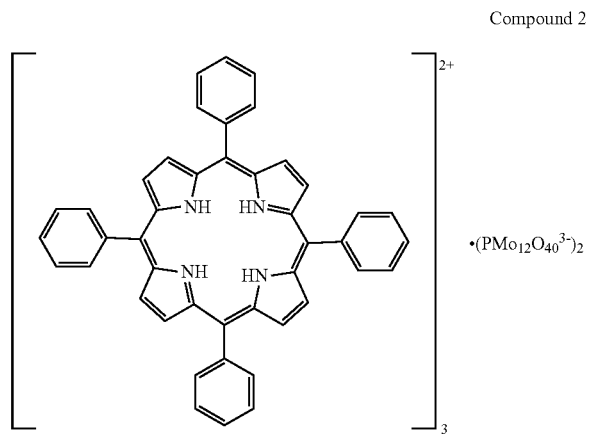

Synthesis Example 3: Synthesis of Compound 3

The following compound 3 was obtained (yield 96%) in the same manner as Synthesis Example 1, except that an equimolar amount of 1-vanado-11-tungstophosphoric acid n-hydrate (manufactured by Nippon Inorganic Colour & Chemical Co., Ltd.) was used in place of the 12-molybdosilicic acid n-hydrate (manufactured by Nippon Inorganic Colour & Chemical Co., Ltd.)

The obtained compound was confirmed to be a target compound from the following analysis results:

MS (MALDI) (m/z): 615(MH$^+$), 2747(MH$_3^-$)

Elemental analysis values: CHN measurement values (35.08%, 2.16%, 3.73%); theoretical values (35.11%, 2.14%, 3.72%)

X-ray fluorescence analysis: V/W/Mo actual ratio (8.6%/91.4%/0%); theoretical values (8.3%/91.7%/0%)

Compound 3

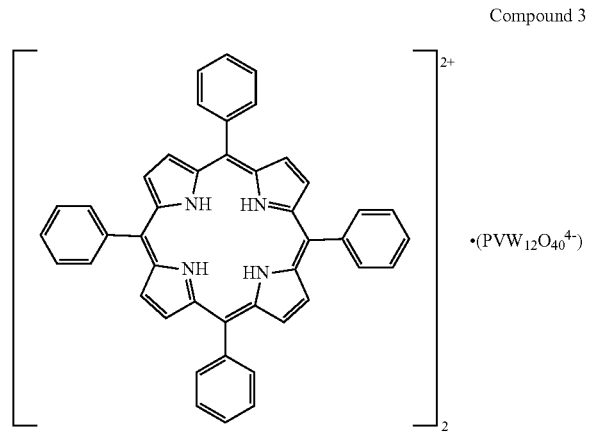

Synthesis Example 4: Synthesis of Compound 4

The following compound 4 was obtained (yield 96%) in the same manner as Synthesis Example 1, except that an equimolar amount of 1-vanado-11-molybdophosphoric acid n-hydrate (manufactured by Nippon Inorganic Colour & Chemical Co., Ltd.) was used in place of the 12-molybdosilicic acid n-hydrate (manufactured by Nippon Inorganic Colour & Chemical Co., Ltd.)

The obtained compound was confirmed to be a target compound from the following analysis results:

MS (MALDI) (m/z): 615(MH$^+$), 1780(MH$_3^-$)

Elemental analysis values: CHN measurement values (26.55%, 1.63%, 2.85%); theoretical values (26.57%, 1.62%, 2.82%)

X-ray fluorescence analysis: V/W/Mo actual ratio (8.2%/0%/91.9%); theoretical values (8.3%/0%/91.7%)

Compound 4

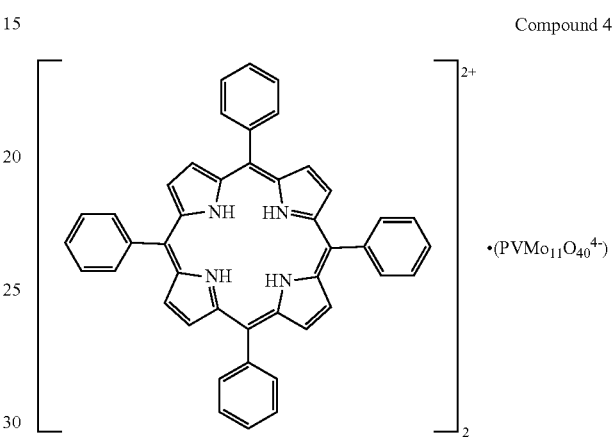

Synthesis Example 5: Synthesis of Compound 5

(1) Synthesis of Intermediate 1

First, 200 g (1.22 mol) of triethylene glycol monomethyl ether (manufactured by Tokyo Chemical Industry Co., Ltd.) was dissolved in dichloromethane (1.0 L). Next, 11.1 g (48.8 mmol) of benzyl triethyl ammonium chloride (manufactured by Tokyo Chemical Industry Co., Ltd.) and 30% NaOH aqueous solution (976 mL) was added to the resulting solution. Then, dichloromethane solution (1.0 L) of 210 g (1.28 mol) of tosyl chloride (manufactured by Kanto Chemical Co., Inc.) was added to the solution in a dropwise manner, and the solution was stirred overnight, thereby obtaining a reaction solution. The reaction solution was poured into water to divide an organic phase. The organic phase was washed with water and then concentrated. A crude product thus obtained was purified by silica-gel chromatography, thereby obtaining 340 g (yield 87%) of a target intermediate 1.

The obtained intermediate 1 was confirmed to be a target compound from $^1$H NMR analysis results.

(2) Synthesis of Intermediate 2

First, 97.3 g (1.02 mol) of 2-formylpyrrole (manufactured by Tokyo Chemical Industry Co., Ltd.) was dissolved in DMF (960 mL), and the resulting solution was cooled down. To the solution, 42.1 g (1.05 mol) of 60% NaH (manufactured by Tokyo Chemical Industry Co., Ltd.) was added at 10° C. or less in several batches, and the solution was stirred for 30 minutes. To the thus-obtained solution, DMF solution (300 mL) of the intermediate 1 (340 g, 1.03 mol) was added in a dropwise manner. The solution was stirred overnight, thereby obtaining a reaction solution. The reaction solution was poured into ice water and extracted with ethyl acetate. An organic phase thus obtained was washed with water and then concentrated, thereby obtaining 213 g (yield 86%) of a target intermediate 2.

The obtained intermediate 2 was confirmed to be a target compound from $^1$H NMR analysis results.

(3) Synthesis of Intermediate 3

The intermediate 2 (213 g, 0.87 mol) was dissolved in DMF (860 mL). Next, 88.6 g (0.95 mol) of 4-methylpyridine manufactured by Kanto Chemical Co., Inc.) was added thereto, and the mixture was stirred for one hour while heating, thereby obtaining a reaction solution. The reaction solution was cooled to room temperature, poured into ice water and extracted with ethyl acetate. A crude product thus obtained was purified by silica-gel chromatography, thereby obtaining 149 g (yield 54%) of a target intermediate 3.

The obtained intermediate 3 was confirmed to be a target compound from $^1$H NMR analysis results.

(4) Synthesis of Intermediate 4

The intermediate 3 (65.6 g, 207 mmol) and 10.7 g (94.2 mmol) of squaric acid (manufactured by Tokyo Chemical Industry Co., Ltd.) were dissolved in toluene/butanol (1/1). Next, 14.9 g (188 mmol) of pyridine (manufactured by Kanto Chemical Co., Inc.) was added thereto. The temperature of the resulting mixture was increased to 100° C., and the mixture was stirred for 5 hours, thereby obtaining a reaction solution. After the reaction solution was cooled down, the reaction solution was filtered and purified by column chromatography, thereby obtaining 1.9 g (yield 3%) of a target intermediate 4.

The obtained intermediate 4 was confirmed to be a target compound from $^1$H NMR analysis results.

$^1$H NMR (CDCl$_3$; δ ppm): 8.72 (d, 4H), 7.91 (d, 4H), 7.85-7.32 (m, 8H), 5.09 (m, 4H), 4.00 (m, 4H), 3.44-3.11 (m, 16H), 2.50 (s, 6H)

(5) Synthesis of Compound 5

First, 2.35 g (0.70 mmol) of 1-vanado-11-tungstophosphoric acid n-hydrate (manufactured by Nippon Inorganic Colour & Chemical Co., Ltd.) was dissolved in 0.025 N hydrochloric acid (300 mL) at 60° C. Next, 1.0 g (1.41 mmol) of the intermediate 4 was added thereto, and the mixture was stirred for one hour. The resulting precipitate was obtained by filtration and washed with water. The obtained precipitate was dried under reduced pressure, thereby obtaining the following compound 5 (yield 99%).

The obtained compound was confirmed to be a target compound from the following analysis results:

MS (MALDI) (m/z): 711(MH$^+$), 2747(MH$_3{}^-$)

Elemental analysis values: CHN measurement values (23.10%, 2.40%, 2.65%); theoretical values (23.02%, 2.41%, 2.68%)

X-ray fluorescence analysis: V/W/Mo actual ratio (8.5%/91.5%/0%); theoretical values (8.3%/91.7%/0%)

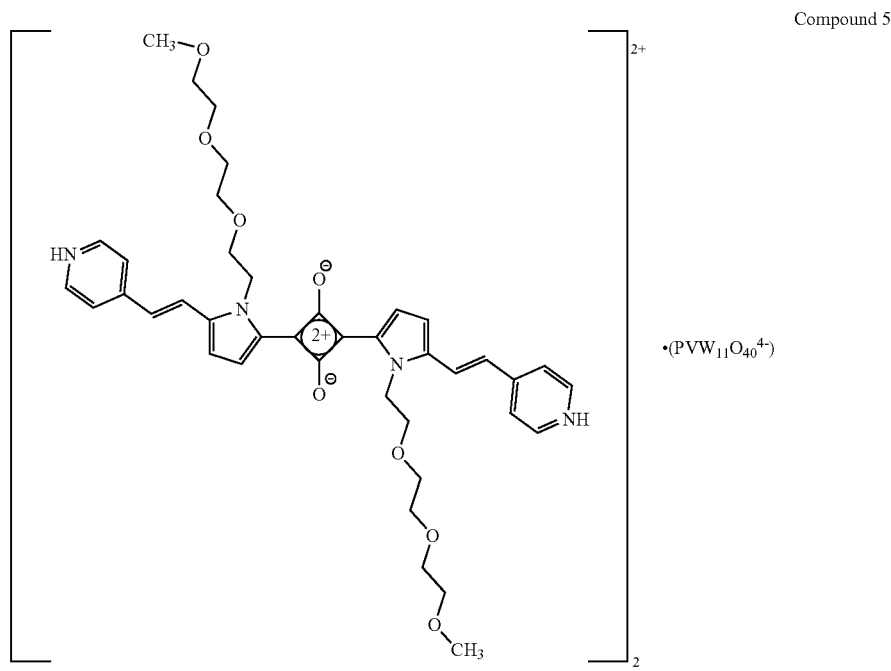

Compound 5

Synthesis Example 6: Synthesis of Compound 6

(1) Synthesis of Intermediate 5

The intermediate 3 (15.0 g, 46.9 mmol) obtained in Synthesis Example 5 was dissolved in methanol, and 5%-Pd/C (manufactured by Kanto Chemical Co., Inc.) was added thereto. The resulting solution was stirred by hydrogen bubbling at room temperature. The solution thus obtained was substituted with argon and then subjected to Celite filtration for concentration, thereby obtaining 14.5 g (yield 97%) of a target intermediate 5.

The obtained compound was confirmed to be a target compound from $^1$H NMR analysis results.

(2) Synthesis of Intermediate 6

The intermediate 5 (14.5 g, 45.5 mmol) and 2.47 g (21.7 mmol) of squaric acid (manufactured by Tokyo Chemical Industry Co., Ltd.) were dissolved in toluene/butanol (1/1). Next, pyridine (3.49 g, 44.0 mmol) was added thereto. The temperature of the resulting mixture was increased to 100° C., and the mixture was stirred for 5 hours, thereby obtaining a reaction solution. After the reaction solution was cooled down, the reaction solution was filtered and purified by column chromatography, thereby obtaining 1.5 g (yield 10%) of a target intermediate 6.

The obtained compound was confirmed to be a target compound from $^1$H NMR analysis results.

$^1$H NMR (CDCl$_3$; δ ppm): 8.52 (m, 4H), 8.49 (m, 2H), 7.19 (d, 4H), 7.13 (d, 2H), 6.30-6.08 (m, 8H), 3.75-2.91 (m, 24H)

(3) Synthesis of Compound 6

First, 2.27 g (0.70 mmol) of 1-vanado-11-tungstophosphoric acid n-hydrate (manufactured by Nippon Inorganic Colour & Chemical Co., Ltd.) was dissolved in methanol (200 mL) at 60° C. Next, 1.0 g (1.40 mmol) of the intermediate 6 was added thereto, and the mixture was stirred for one hour. The resulting precipitate was obtained by filtration and washed with water. The obtained precipitate was dried under reduced pressure, thereby obtaining the following compound 6 (yield 95%).

The obtained compound was confirmed to be a target compound from the following analysis results:

MS(MALDI) (m/z): 715(MH$^+$), 2747(MH$_3^-$)

Elemental analysis values: CHN measurement values (23.02%, 2.24%, 2.70%); theoretical values (23.06%, 2.23%, 2.69%)

X-ray fluorescence analysis: V/W/Mo actual ratio (8.4%/91.6%/0%); theoretical values (8.3%/91.7%/0%)

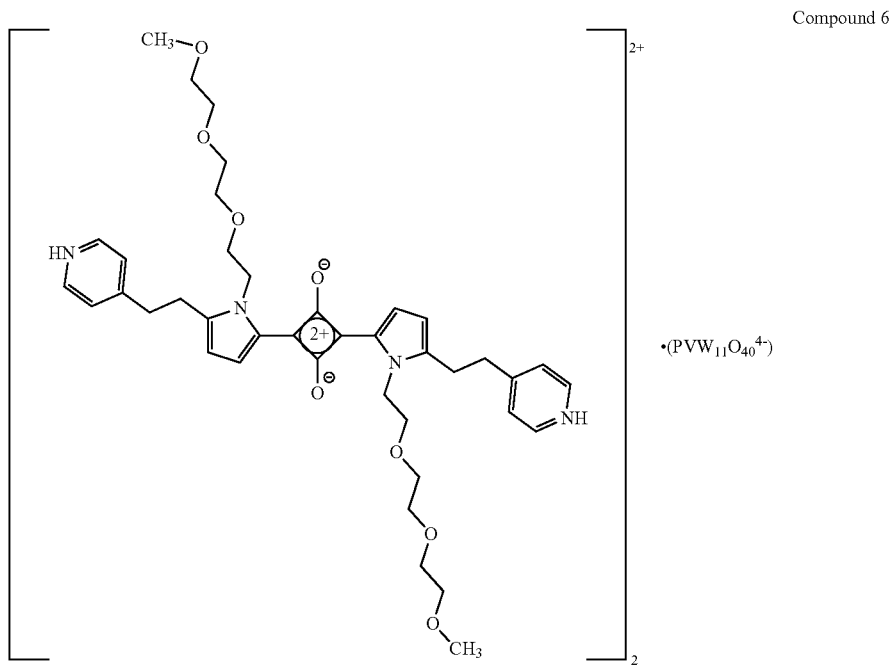

Compound 6

Comparative Synthesis Example 1: Synthesis of Compound 7

The following compound 7 was obtained (yield 99%) in the same manner as Synthesis Example 1, except that 7.26 g (2.27 mmol) of 12-tungstophosphoric acid n-hydrate (manufactured by Nippon Inorganic Colour & Chemical Co., Ltd.) was used in place of the 12-molybdosilicic acid n-hydrate (manufactured by Nippon Inorganic Colour & Chemical Co., Ltd.)

The obtained compound was confirmed to be a target compound from the following analysis results:

MS (MALDI) (m/z): 615(MH$^+$), 2879(MH$_3^-$)

Elemental analysis values: CHN measurement values (20.83%, 1.30%, 2.19%); theoretical values (20.85%, 1.27%, 2.21%)

X-ray fluorescence analysis: V/W/Mo actual ratio (0%/100%/0%); theoretical values (0%/100%/0%)

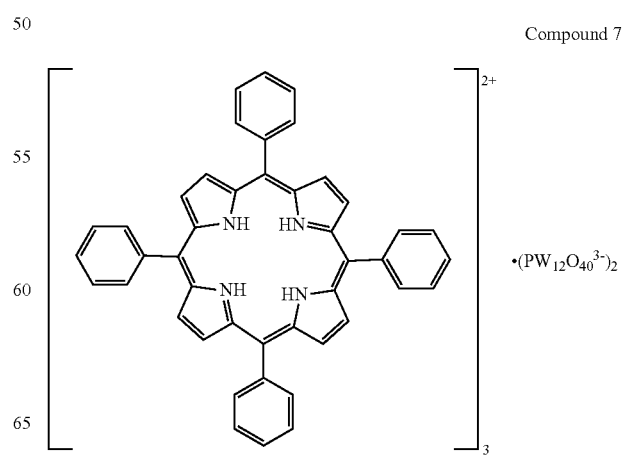

Compound 7

Comparative Synthesis Example 2: Synthesis of Compound 8

The following compound 8 was obtained (yield 99%) in the same manner as Synthesis Example 1, except that an equimolar amount of 12-tungstosilicic acid n-hydrate (manufactured by Nippon Inorganic Colour & Chemical Co., Ltd.) was used in place of the 12-molybdosilicic acid n-hydrate (manufactured by Nippon Inorganic Colour & Chemical Co., Ltd.)

The obtained compound was confirmed to be a target compound from the following analysis results:

MS (MALDI) (m/z): 615(MH$^+$), 2877(MH$_3^-$)

Elemental analysis values: CHN measurement values (25.75%, 1.55%, 2.71%); theoretical values (25.73%, 1.57%, 2.73%)

X-ray fluorescence analysis: V/W/Mo actual ratio (0%/100%/0%); theoretical values (0%/100%/0%)

Compound 8

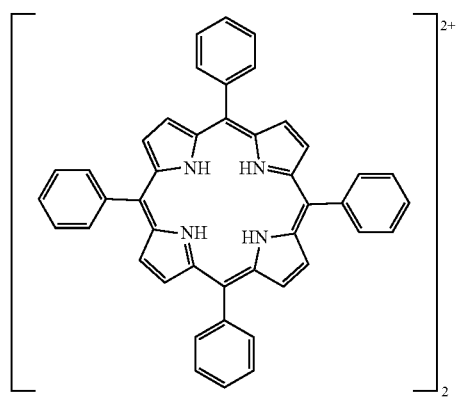

Comparative Synthesis Example 3

An intermediate 4 was synthesized in the same manner as Synthesis Example 5 and used as a compound 9.

Compound 9

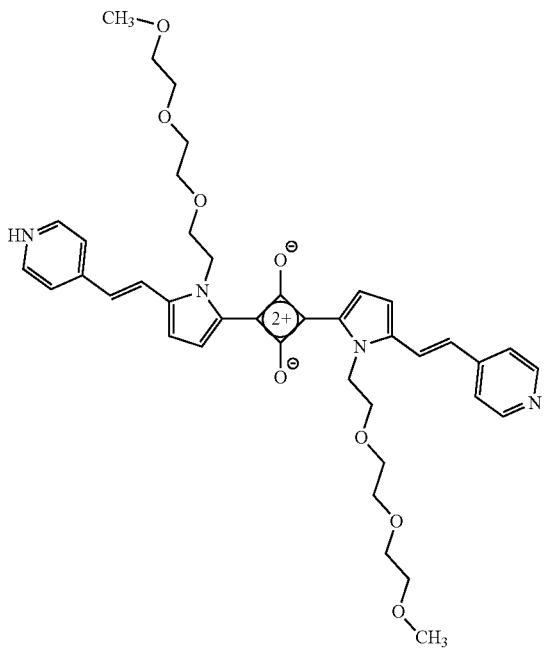

Comparative Synthesis Example 4

An intermediate 6 was synthesized in the same manner as Synthesis Example 6 and used as a compound 10.

Compound 10

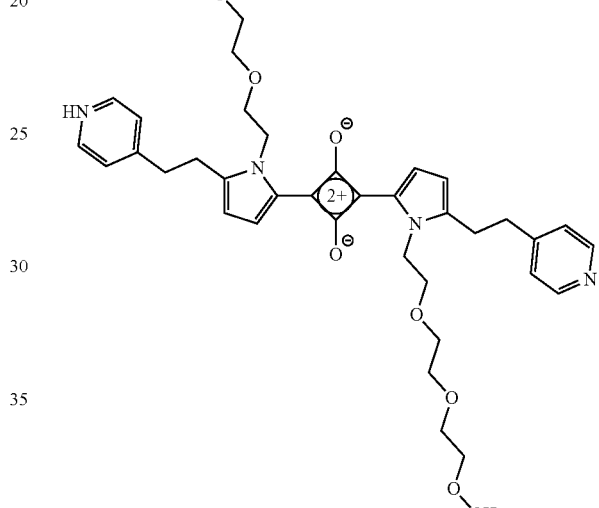

Comparative Synthesis Example 5: Synthesis of Compound 11

The following compound 11 was obtained (yield 96%) in the same manner as Synthesis Example 5, except that 3.14 g (0.94 mmol) of 12-tungstophosphoric acid n-hydrate (manufactured by Nippon Inorganic Colour & Chemical Co., Ltd.) was used in place of the 1-vanado-11-tungstophosphoric acid n-hydrate (manufactured by Nippon Inorganic Colour & Chemical Co., Ltd.)

The obtained compound was confirmed to be a target compound from the following analysis results:

MS (MALDI) (m/z): 711(MH$^+$), 2879(MH$_3^-$)

Elemental analysis values: CHN measurement values (18.32%, 1.89%, 2.16%); theoretical values (18.25%, 1,91%, 2.13%)

X-ray fluorescence analysis: V/W/Mo actual ratio (0%/100%/0%); theoretical values (0%/100%/0%)

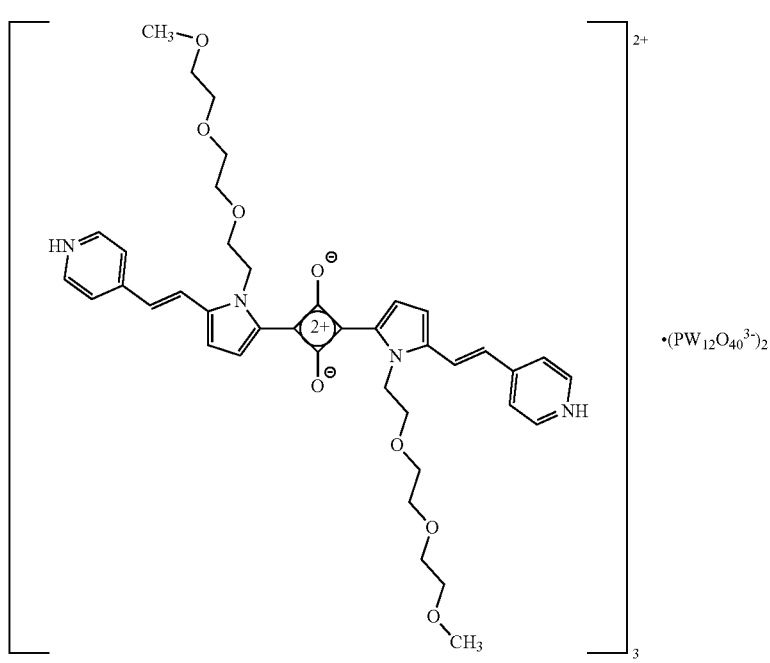

Compound 11

Comparative Synthesis Example 6: Synthesis of Compound 12

The following compound 12 was obtained (yield 94%) in the same manner as Synthesis Example 6, except that 3.12 g (0.93 mmol) of 12-tungstophosphoric acid n-hydrate (manufactured by Nippon Inorganic Colour & Chemical Co., Ltd.) was used in place of the 1-vanado-11-tungstophosphoric acid n-hydrate (manufactured by Nippon Inorganic Colour & Chemical Co., Ltd.)

The obtained compound was confirmed to be a target compound from the following analysis results:

MS(MALDI) (m/z): 715(MH$^+$), 2879(MH$_3^-$)

Elemental analysis values: CHN measurement values (18.30%, 1.80%, 2.15%); theoretical values (18.27%, 1.76%, 2.13%)

X-ray fluorescence analysis: V/W/Mo actual ratio (0%/100%/0%); theoretical values (0%/100%/0%)

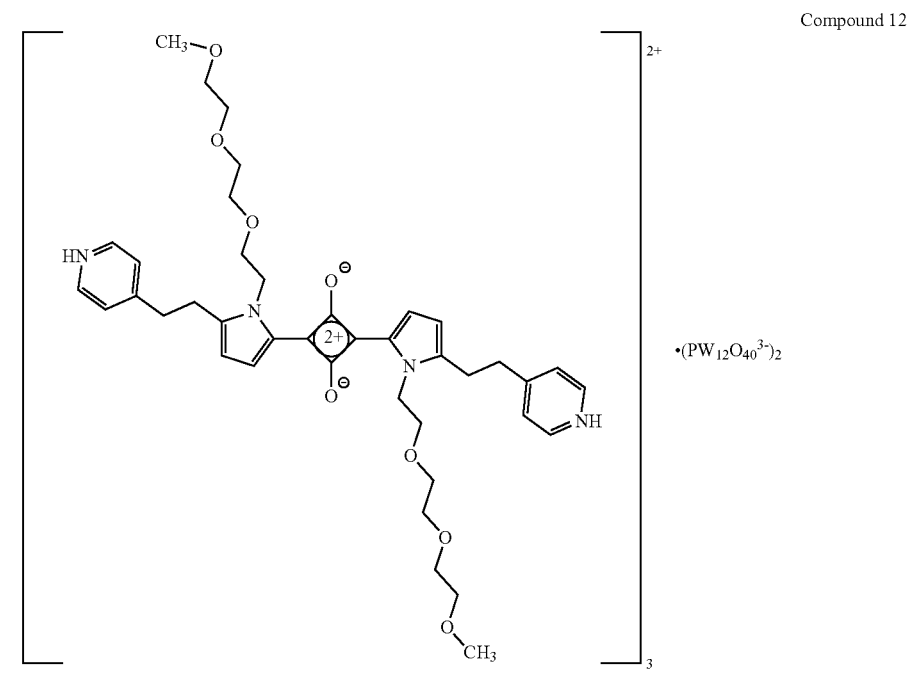

Compound 12

Preparation Example 1: Preparation of Dispersant Solution (1) Preparation of Block Copolymer First, 100 parts by mass of dehydrated tetrahydrofuran (THF) and 3.00 parts by mass of dimethylketene methyl trimethylsilyl acetal were put in a reactor equipped with a cooling tube, an addition funnel, a nitrogen inlet, a mechanical stirrer and a digital thermometer. Nitrogen substitution was sufficiently carried out thereon. Next, 0.25 part by mass of a 1 M solution of tetrabutylammonium m-chlorobenzoate in acetonitrile, was injected into the reactor by a syringe. Then, a mixed solution of 50.0 parts by mass of methyl methacrylate, 30.0 parts by mass of n-butyl methacrylate and 20.0 parts by mass of benzyl methacrylate was added in a dropwise manner for 60 minutes. The reactor was cooled in an ice bath to keep the temperature at less than 40° C. After one hour passed, 50.0 parts by mass of glycidyl methacrylate (GMA) was added in a dropwise manner for 30 minutes. After the mixture was reacted for one hour, 1 part by mass of methanol was added to stop the reaction. To the thus-obtained solution of the block copolymer in THF, 450.0 parts by mass of propylene glycol methyl ether acetate (PGMEA) was added. Solvent substitution was carried out thereon by evaporation, thereby obtaining a solution of the block copolymer in 25.0% by mass PGMEA.

The thus-obtained block copolymer had a mass average molecular weight (Mw) of 11320, a number average molecular weight (Mn) of 8950, and a molecular weight distribution (Mw/Mn) of 1.26.

(2) Preparation of Phosphorus-Based Block Copolymer Solution

First, 27.80 parts by mass of PGMEA and 9.27 parts by mass of phenylphosphonic acid (PPA) were put in a reactor equipped with a cooling tube, an addition funnel, a nitrogen inlet, a mechanical stirrer and a digital thermometer. While stirring the mixture under a nitrogen flow, the mixture was heated to a temperature of 90° C. To the mixture, 100.0 parts by mass of the block copolymer was added in a dropwise manner for 30 minutes, and the mixture was heated and stirred for two hours, thereby obtaining a phosphorus-based block copolymer (dispersant) solution (solid content 25% by mass). The progress of an esterification reaction between the PPA and the GMA of the block copolymer was confirmed by acid value measurement and $^1$H-NMR measurement. The thus-obtained phosphorus-based block copolymer had an acid value of 100 mgKOH/g.

Preparation Example 2: Preparation of Binder Composition

A binder composition (solid content 40% by mass) was prepared by mixing the following: 60.0 parts by mass of PGMEA, 38.40 parts by mass of a polyfunctional monomer ("ARONIX M305" manufactured by Toagosei Co., Ltd.) and 1.60 parts by mass of a photoinitiator ("IRGACURE 184" manufactured by BASF).

Example 1

(1) Preparation of Color Material Dispersion Liquid

First, 10.00 parts by mass of the compound 1 of Synthesis Example 1, 20.0 parts by mass (solid content 25.0% by mass) of the dispersant solution of Preparation Example 1, and 185 parts by mass of PGMEA were mixed. Using a paint shaker (manufactured by Asada Iron Works Co., Ltd.), the mixture was subjected to a pre-dispersion for 1 hour with 2 mm zirconia beads and then a main dispersion for 6 hours with 0.1 mm zirconia beads, thereby obtaining a color material dispersion liquid 1.

(2) Preparation of Color Material-Containing Binder Composition

First, 3.64 parts by mass of the color material dispersion liquid obtained in the above (1), 4.32 parts by mass of the binder composition of Preparation Example 2, 2.05 parts by mass of PGMEA, 0.05 part by mass of surfactant R08MH (product name, manufactured by DIC) and 0.05 part by mass of silane coupling agent KBM503 (product name, manufactured by Shin-Etsu Silicones) were mixed. The mixture thus obtained was subjected to pressure filtration, thereby obtaining the color material-containing binder composition 1 of Example 1.

Examples 2 to 6

(1) Preparation of Color Material Dispersion Liquids

Color material dispersion liquids 2 to 6 were obtained in the same manner as the above (1) of Example 1, except that the compound 1 was changed to each of the compounds 2 to 6.

(2) Preparation of Color Material-Containing Binder Compositions

The color material-containing binder compositions 2 to 6 of Examples 2 to 6 were obtained in the same manner as the above (2) of Example 1, except that the color material dispersion liquid 1 was changed to each of the color material dispersion liquids 2 to 6.

Comparative Example 1

(1) Preparation of Comparative Color Material Solution

First, 10.00 parts by mass of tetraphenylporphyrin (manufactured by Tokyo Chemical Industry Co., Ltd.) and 190 parts by mass of PGMEA were mixed. The mixture was stirred for one hour with a magnetic stir bar, thereby obtaining a comparative color material solution 1.

(2) Preparation of Comparative Color Material-Containing Binder Composition

The comparative color material-containing binder composition 1 of Comparative Example 1 was obtained in the same manner as the above (2) of Example 1, except that the color material dispersion liquid 1 was changed to the comparative color material solution 1.

Comparative Examples 2 to 7

(1) Preparation of Comparative Color Material Dispersion Liquids

Comparative color material dispersion liquids 2 to 7 were prepared in the same manner as the above (1) of Example 1, except that the compound 1 was changed to each of the compounds 7 to 12.

(2) Preparation of Comparative Color Material-Containing Binder Compositions

The comparative color material-containing binder compositions 2 to 7 of Comparative Examples 2 to 7 were obtained in the same manner as the above (2) of Example 1, except that the color material dispersion liquid 1 was changed to each of the comparative color material dispersion liquids 2 to 7.

[Evaluation]

<Film Production and Initial Spectrometry>

Each of the color material-containing binder compositions obtained in Examples and Comparative Examples was applied onto each of glass substrates with a thickness of 0.7 mm (product name: OA-10G, manufactured by: Nippon Electric Glass Co., Ltd.) using a spin coater, and then heat-dried on a hot plate at 80° C. for 3 minutes, thereby obtaining coating films. The coating films were irradiated with ultraviolet light at 500 mJ/cm² using an ultrahigh-pressure mercury lamp, thereby obtaining cured films having a film thickness of 3 μm. The transmission spectrum, chromaticity (x, y), luminance (Y) and L, a, b ($L_1$, $a_1$, $b_1$) of the obtained cured films were measured by MICROSCOPIC SPECTROPHOTOMETER OSP-SP200 (product name, manufactured by Olympus Corporation).

At that time, the color materials deposited after the comparative color material-containing binder compositions 1, 4 and 5 of Comparative Examples 1, 4 and 5 were applied, and a uniform coating film could not be obtained.

For the measured transmission spectrum, the transmittance difference ΔT (%) between the transmittance of the minimum transmission wavelength (the wavelength at which the transmittance is minimum) in the visible range (400 nm to 700 nm) and the transmittance of the baseline was obtained. Next, the transmittance $T_{1/2}$(%) at which the transmittance difference ΔT (%) was ½, was calculated. A half-width was calculated from the difference between the maximum and minimum wavelengths satisfying $T_{1/2}$(%) of a valley from the baseline, the valley giving the minimum transmission wavelength of the transmission spectrum (i.e., the valley width). The minimum transmission wavelength of the transmission spectrum corresponds to the maximum absorption wavelength of the absorption spectrum.

<Light Resistance Test>

Under the atmospheric pressure, the cured films obtained in Examples 1 to 6 and Comparative Examples 2 to 3, 6 to 7 were irradiated with a xenon lamp (SUNTEST XLS+ (a 1.7 kW air-cooled xenon lamp) manufactured by ATLAS) at a wavelength of from 300 nm to 400 nm and an irradiance of 58 W/m² for 60 hours (equivalent to 11000 kJ/m²). The transmission spectrum and color coordinates ($L_2$, $a_2$, $b_2$) of the cured films after being subjected to the irradiation, were measured again.

The maximum absorption wavelength of the dyes, that is, the retention rate of the transmittance value of the minimum transmission wavelength of the transmission spectrum, was calculated by the following formula (1). For the porphyrin compound, the minimum transmission wavelength of the transmission spectrum was about 420 nm. For the squarylium compound, it was about 580 nm.

The retention rate=(100−The transmittance (%) of the minimum transmission wavelength after the test)/(100−The transmittance (%) of the minimum transmission wavelength before the test)×100     (1):

Also, the color difference (ΔEab) before and after the irradiation was calculated by the following formula for light resistance evaluation.

$$\Delta Eab = \{(L_2-L_1)^2+(a_2-a_1)^2+(b_2-b_1)^2\}^{1/2} \quad (2):$$

The evaluation results are shown in the following Table 7.

TABLE 7

|  | Color material | Oxidation-reduction potential (V) of heteropolyoxometalate | Half-width (nm) | Retention rate (%) after light resistance test | Color difference (ΔEab) before and after light resistance test |
|---|---|---|---|---|---|
| Example 1 | Compound 1 | −0.232 | 50 | 94.0 | 10.1 |
| Example 2 | Compound 2 | −0.082 | 51 | 91.8 | 12.0 |
| Example 3 | Compound 3 | 0.224 | 52 | 94.5 | 8.2 |
| Example 4 | Compound 4 | 0.261 | 52 | 94.8 | 7.5 |
| Example 5 | Compound 5 | 0.224 | 95 | 74.5 | 22.0 |
| Example 6 | Compound 6 | 0.224 | 43 | 85.5 | 17.7 |
| Comparative Example 1 | Tetraphenylporphyrin | — | — | — | — |
| Comparative Example 2 | Compound 7 | −0.491 | 52 | 8.6 | 56.4 |
| Comparative Example 3 | Compound 8 | −0.495 | 50 | 59.2 | 40.5 |
| Comparative Example 4 | Compound 9 | — | — | — | — |
| Comparative Example 5 | Compound 10 | — | — | — | — |
| Comparative Example 6 | Compound 11 | −0.491 | 97 | 4.0 | 79.2 |
| Comparative Example 7 | Compound 12 | −0.491 | 44 | 3.2 | 82.1 |

CONCLUSION

It was revealed that the films of Examples 1 to 6 using the color material being the salt-forming compound of the heteropolyoxometalate having an oxidation-reduction potential larger than −0.3 V, have excellent light resistance since, compared to the films of Comparative Examples 2, 3, 6 and 7 using the color material being the salt-forming compound of the heteropolyoxometalate having an oxidation-reduction potential smaller than −0.3 V, the retention rate of the transmittance of the minimum transmission wavelength before and after the light resistance test, is remarkably high, and the color difference before and after the light resistance test is small. In Comparative Examples 1, 4 and 5 in which the organic dyes were used as the color material, the color material deposited after it was applied, and a uniform coating film could not be obtained. It was revealed that in the case of using the color material dispersion liquid and composition of the disclosed embodiments, a film with excellent light resistance can be formed while the desired light in the unnecessary wavelength range is selectively and effectively absorbed and reduced. It was also revealed that the film of the disclosed embodiments can be used as the optical filter which absorbs light in the given wavelength range such as the visible range (especially 400 nm to 700 nm) and which is excellent in light resistance.

REFERENCE SIGNS LIST

100, 101. Image display device
10, 10'. Display panel
11, 13, 17, 19. Protective film
12, 18. Polarizer
14, 16, 16'. Light transmissive pressure-sensitive adhesive layer
20. Backlight device
30. Touch panel
40, 50. Electroconductive film
41, 51. Light transmissive substrate
42, 52. Light transmissive functional layer
43, 53. Electroconductive layer
44, 54. Electroconductive section
45, 55. Non-electroconductive section
61. Light transmissive cover member
62, 63. Light transmissive pressure-sensitive adhesive layer
70. Light transmissive adhesion layer
80. Hard coat layer

The invention claimed is:

1. A salt-forming compound represented by the following general formula (3):

General Formula (3)

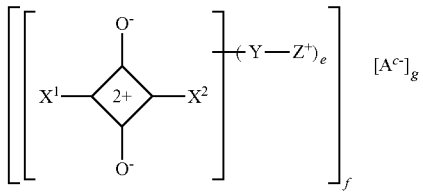

where $X^1$ and $X^2$ each independently represent an aromatic ring group optionally containing a substituent; Y represents a divalent hydrocarbon group that the carbon atom directly bound to $X^1$ or $X^2$ does not have a π bond; $Z^+$ represents an organic cation group; e represents an integer of from 1 to 4; and when e is 2 or more, a plurality of Ys and a plurality of $Z^+$s may be each the same or different;

$A^{c-}$ represents a heteropolyoxometalate anion which is a c-valent anion and which has an oxidation-reduction potential larger than −0.3 V relative to the silver/silver chloride electrode; f and c are each an integer of 2 or more; g is an integer of 1 or more; and the salt-forming compound is a normal salt that f×e=c×g.

2. The salt-forming compound according to claim 1, wherein the heteropolyoxometalate anion is a heteropolyoxometalate anion containing vanadium.

3. A color material which is a salt-forming compound represented by the following general formula (3):

General Formula (3)

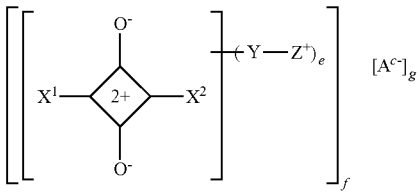

where $X^1$ and $X^2$ each independently represent an aromatic ring group optionally containing a substituent; Y represents a divalent hydrocarbon group that the carbon atom directly bound to $X^1$ or $X^2$ does not have a π bond; $Z^+$ represents an organic cation group; e represents an integer of from 1 to 4; and when e is 2 or more, a plurality of Ys and a plurality of $Z^+$s may be each the same or different;

$A^{c-}$ represents a heteropolyoxometalate anion which is a c-valent anion and which has an oxidation-reduction potential larger than −0.3 V relative to the silver/silver chloride electrode; f and c are each an integer of 2 or more; g is an integer of 1 or more; and the salt-forming compound is a normal salt that f×e=c×g.

4. The color material according to claim 3, wherein the heteropolyoxometalate anion is a heteropolyoxometalate anion containing vanadium.

\* \* \* \* \*